(12) United States Patent
Gonion

(10) Patent No.: US 9,390,058 B2
(45) Date of Patent: Jul. 12, 2016

(54) DYNAMIC ATTRIBUTE INFERENCE

(71) Applicant: Apple Inc., Cupertino, CA (US)

(72) Inventor: Jeffry E. Gonion, Campbell, CA (US)

(73) Assignee: Apple Inc., Cupertino, CA (US)

( * ) Notice: Subject to any disclaimer, the term of this patent is extended or adjusted under 35 U.S.C. 154(b) by 416 days.

(21) Appl. No.: 14/034,680

(22) Filed: Sep. 24, 2013

(65) Prior Publication Data

US 2015/0089192 A1   Mar. 26, 2015

(51) Int. Cl.
*G06F 15/78* (2006.01)
*G06F 9/30* (2006.01)
*G06F 9/40* (2006.01)

(52) U.S. Cl.
CPC ............. *G06F 15/78* (2013.01); *G06F 9/3013* (2013.01); *G06F 9/30036* (2013.01); *G06F 9/30105* (2013.01)

(58) Field of Classification Search
CPC ............ G06F 9/30105; G06F 9/30036; G06F 9/3013; G06F 9/3887; G06F 15/8007; G06F 15/8053; G06F 15/8084; G06F 15/8076
See application file for complete search history.

(56) References Cited

U.S. PATENT DOCUMENTS

| | | | |
|---|---|---|---|
| 4,862,392 A | 8/1989 | Steiner | |
| 5,623,636 A | 4/1997 | Revilla et al. | |
| 5,991,531 A * | 11/1999 | Song et al. | 703/26 |
| 6,073,159 A | 6/2000 | Emer et al. | |
| 6,185,671 B1 | 2/2001 | Pentovski et al. | |
| 7,395,419 B1 | 7/2008 | Gonion | |
| 7,617,496 B2 | 11/2009 | Gonion | |
| 7,620,797 B2 | 11/2009 | Gonion et al. | |
| 7,624,251 B2 | 11/2009 | Gonion et al. | |
| 7,739,442 B2 | 6/2010 | Gonion | |
| 7,975,134 B2 | 7/2011 | Gonion | |
| 8,019,976 B2 | 9/2011 | Gonion et al. | |
| 8,019,977 B2 | 9/2011 | Gonion et al. | |
| 8,060,728 B2 | 11/2011 | Gonion et al. | |
| 8,078,847 B2 | 12/2011 | Gonion et al. | |
| 8,131,979 B2 | 3/2012 | Gonion et al. | |
| 8,176,299 B2 | 5/2012 | Gonion et al. | |

(Continued)

OTHER PUBLICATIONS

Amir Roth, et al "Speculative Data-Driven Multithreading" Technical Report #1414, University of Wisconsin, Apr. 2000, pp. 1-21.

(Continued)

*Primary Examiner* — Daniel Pan
(74) *Attorney, Agent, or Firm* — Meyertons, Hood, Kivlin, Kowert & Goetzel, P.C.; Lawrence J. Merkel

(57) ABSTRACT

In an embodiment, a processor may be configured to dynamically infer one or more attributes of input and/or output registers of an instruction, given the attributes corresponding to at least one input registers. The inference may be made at the issue circuit/stage of the processor, for those registers that do not have attribute information at the issue circuit/stage. In an embodiment, the processor may also include a register attribute tracker configured to track attributes of registers prior to the issue stage of the processor pipeline. The processor may feed back, to the register attribute tracker, inferred attributes and the register addresses of the registers to which the inferred attributes apply. The register attribute tracker may be configured to may associate the inferred attribute with the identified register attribute tracker may also be configured to infer input register attributes from other input register attributes.

20 Claims, 12 Drawing Sheets

(56) References Cited

U.S. PATENT DOCUMENTS

| | | |
|---|---|---|
| 8,181,001 B2 | 5/2012 | Gonion et al. |
| 8,271,832 B2 | 9/2012 | Gonion et al. |
| 8,356,159 B2 | 1/2013 | Gonion et al. |
| 8,356,164 B2 | 1/2013 | Gonion et al. |
| 8,359,460 B2 | 1/2013 | Gonion et al. |
| 8,359,461 B2 | 1/2013 | Gonion et al. |
| 8,364,938 B2 | 1/2013 | Gonion et al. |
| 8,370,608 B2 | 2/2013 | Gonion et al. |
| 8,402,255 B2 | 3/2013 | Gonion et al. |
| 8,412,914 B2 | 4/2013 | Gonion |
| 8,417,921 B2 | 4/2013 | Gonion et al. |
| 8,447,956 B2 | 5/2013 | Gonion et al. |
| 8,464,031 B2 | 6/2013 | Gonion |
| 8,484,443 B2 | 7/2013 | Gonion |
| 8,504,806 B2 | 8/2013 | Gonion |
| 8,527,737 B2 | 9/2013 | Gonion |
| 8,527,742 B2 | 9/2013 | Gonion |
| 8,539,205 B2 | 9/2013 | Gonion |
| 2004/0117595 A1 | 6/2004 | Norris |
| 2004/0193837 A1 | 9/2004 | Devaney |
| 2004/0199749 A1 | 10/2004 | Golla et al. |
| 2006/0259737 A1 | 11/2006 | Sachs |
| 2007/0223629 A1* | 9/2007 | Zeng et al. ............... 375/341 |
| 2008/0016320 A1* | 1/2008 | Menon et al. ............. 712/22 |
| 2008/0046683 A1* | 2/2008 | Codrescu et al. ......... 712/7 |
| 2008/0288745 A1* | 11/2008 | Gonion et al. ............ 712/4 |
| 2010/0042789 A1 | 2/2010 | Gonion |
| 2015/0089190 A1* | 3/2015 | Gonion ..................... 712/7 |

OTHER PUBLICATIONS

U.S. Appl. No. 14/034,640, filed Sep. 24, 2013, Jeffrey E. Gonion.
Office Action, U.S. Appl. No. 14/034,640, filed Sep. 24, 2013, Jeffry E Gonion; mailed Feb. 25, 2016, 17 pages.

* cited by examiner

| | | | | |
|---|---|---|---|---|
| x = 0, | A[x] = 1, | r = 1, | s = 0, | B[x] = 1 |
| x = 1, | A[x] = 10, | r = 1, | s = 16, | B[x] = 17 |
| x = 2, | A[x] = 16, | r = 1, | s = 16, | B[x] = 17 |
| x = 3, | A[x] = 16, | r = 1, | s = 26, | B[x] = 27 |
| x = 4, | A[x] = 26, | r = 1, | s = 29, | B[x] = 30 |
| x = 5, | A[x] = 29, | r = 1, | s = 9, | B[x] = 10 |
| x = 7, | A[x] = 9, | r = 13, | s = 9, | B[x] = 22 |
| x = 7, | A[x] = 1, | r = 0, | s = 9, | B[x] = 9 |
| x = 8, | A[x] = 20, | r = 0, | s = 20, | B[x] = 20 |
| x = 9, | A[x] = 0, | r = 17, | s = 20, | B[x] = 37 |
| x = 10, | A[x] = 16, | r = 17, | s = 9, | B[x] = 26 |
| x = 11, | A[x] = 14, | r = 17, | s = 1, | B[x] = 18 |
| x = 12, | A[x] = 20, | r = 17, | s = 17, | B[x] = 34 |
| x = 13, | A[x] = 14, | r = 17, | s = 19, | B[x] = 36 |
| x = 14, | A[x] = 22, | r = 17, | s = 15, | B[x] = 32 |
| x = 15, | A[x] = 13, | r = 17, | s = 30, | B[x] = 47 |

Fig. 11A

| x = | 0 | 1 | 2 | 3 | 4 | 5 | 6 | 7 |
|---|---|---|---|---|---|---|---|---|
| A[x] = | 1 | 10 | 16 | 16 | 26 | 29 | 9 | 1 |
| r = A[x+s] = | 1 | | | | | | | |
| s = A[x+r] = | | 16 | 16 | 26 | 29 | 9 | | |
| r = A[x+s] = | | | | | | | 13 | 0 |
| B[x] = | 1 | 17 | 17 | 27 | 30 | 10 | 22 | 9 |

| x = | 8 | 9 | 10 | 11 | 12 | 13 | 14 | 15 |
|---|---|---|---|---|---|---|---|---|
| A[x] = | 20 | 0 | 16 | 14 | 20 | 14 | 22 | 13 |
| s = A[x+r] = | 20 | | | | | | | |
| r = A[x+s] = | | 17 | | | | | | |
| s = A[x+r] = | | | 9 | 1 | 17 | 19 | 15 | 30 |
| B[x] = | 20 | 37 | 26 | 18 | 34 | 36 | 32 | 47 |

Fig. 11B

Source Code

```
r = 0 ;
s = 0 ;
for (x=0; x<KSIZE; ++x)
{
    if (A[x] < FACTOR)
    {
        r = A[x+s] ;
    {
    else
    {
        s = A[x+r] ;
    }
    B[x] = r + s ;
}
```

Fig. 12A

Vectorized Code

```
r = 0 ;
s = 0 ;
x = VectorIndex (0,1) ;
goto Loop1Tail ;
Loop1:
    s = PropagatePriorF (s,p0) ;
    ~p0; t = VectorReadInt (A, x) ;
    p1 = (t < FACTOR) ;
    i2 = ConditionalStop (p1, kTF | kFT) ;
    p2 = 0 ;
Loop2:
    !p0; p2 = GeneratePredicates (p2, i2) ;
    ~p2; t = VectorTest (p1) ;
    if ( !FIRST () ) goto Skip1 ;
    t1 = x + s ;
    ~p2; r = VectorReadInt (A, t1) ;
    goto Skip2 ;
Skip1 :
    r = PropagatePriorF (r, p2) ;
    t2 = x + r ;
    ~p2; s = VectorReadInt (A, t2) ;
    s = PropagatePostT (s, s, p2) ;
Skip2 :
    if ( !CARRY () ) goto Loop2 ;
    v = r + s ;
    ~p0; s = VectorWriteInt (B, x, v) ;
    x += VECLEN ;
Loop1Tail:
    p0 = (x < KSIZE) ;
    if ( FIRST (p0) ) goto Loop1 ;
```

Fig. 12B

Example 2A
Vectorized
(Non-Speculative)

```
j = 0;
x = VectorIndex (0,1) ;
goto Loop1Tail;
Loop1:
    p3 = 0;
    j = PropagatePriorF (j, p0) ;
    ~p0; t = VectorReadInt (A, x) ;
    p1 = t < FACTOR;
    p2 = ConditionalStop (p1, kTT | kTF) ;
Loop2:
    t = x + j ;
    !p0; p3 = GeneratePredicates (p3, p2) ;
    ~p3; t = VectorTest (p1) ;
    if ( NONE () ) goto Loop2Tail ;
    !p3; p4 = p1 + 0;
    ~p4; j = VectorRead (A, t) ;
    j = PropagatePostT (j, j, p4) ;
Loop2Tail:
    if ( !CARRY () ) goto Loop2
    ~p0; VectorWrite (B, x, j) ;
    x += VECLEN;
Loop1Tail:
    p0 = (x < KSIZE) ;
    if ( FIRST () ) goto Loop1;
```

Fig. 13A

Example 2B
Vectorized
(Speculative)

```
j = 0;
x = VectorIndex (0,1) ;
goto Loop1Tail ;
Loop1:
    p3 = 0 ;
    j = PropagatePriorF (j, p0) ;
Loop2:
    !p0; p5 = Remaining (p3) ;
    ~p5; t = x + j ;
    ~p5; t = VectorReadIntFF (A, t, ps) ;
    ~p5; p5 &= ps ;
    ~p5; p1 (t < FACTOR) ;
    !p5; i2 = ConditionalStop (p1, kTT | kTF) ;
    !p0; p3 = GeneratePredicates (p3, i2) ;
    ~p3; VectorTest (p1) ;
    ~p3; if (NONE () ) goto Loop2Tail ;
    !p3; p4 = p1 + 0 ;
    ~p4; j = VectorRead (A, x) ;
    j = PropagatePostT (j, j, p4) ;
Loop2Tail:
    ~p0; VectorTest (p3) ;
    if ( !LAST () ) goto Loop2 ;
    ~p0; VectorWrite (B, x, j) ;
    x += VECLEN ;
Loop1Tail:
    p0 = (x < KSIZE) ;
    if ( FIRST () ) goto Loop1 ;
```

Fig. 13B

Example 3
Vectorized

```
        x = VectorIndex (0,1) ;
        goto Loop1Tail ;
Loop1:
    ~p0; r = VectorReadInt(C,x);
    ~p0; s = VectorReadInt (D, x) ;
    i1 = CheckHazardP(r,x,p0);
    i2 = CheckHazardP(s,x,p0);
    i3 = VectorMax(i1,i2);
    p4 = 0 ;
Loop2:
    ~p0; p4 = GeneratePredicates (p4, i3) ;
    ~p4; t1 = VectorReadInt(A,r) ;
    ~p4; t2 = VectorReadInt(A,s);
    ~p4; t3 = t1 + t2 ;
    ~p4; VectorWriteInt(A,x,t3);
    ~p0; if (!CARRY( )) goto Loop2;
    x += VECLEN;
Loop1Tail:
    p0 = (x < KSIZE) ;
    if ( FIRST (p0) ) goto Loop1 ;
```

Fig. 14

Example 4
Vectorized

```
            x = VectorIndex (0,1) ;
            goto Loop1Tail ;
Loop1:
    j = PropagatePriorF(j,p0);
    ~p0; f = VectorReadInt(A,x);
    ~p0; g = VectorReadInt (B, x) ;
    !p0; p1 = (f < FACTOR);
    !p0; p2 = (g < FACTOR);
    ~p1; h = VectorReadInt(C,x);
    ~p2; i = VectorReadInt(D,x);
    !p1; ix = CheckHazardP(h,i,p2);
    p3 = 0 ;
Loop2:
    p3 = GeneratePredicates (p3, ix) ;
    !p3; p4 = p1 + 0;
    !p3; p5 = p2 + 0;
    ~p4; j = VectorReadInt(E,h);
    j = CopyPropagate(j,j,p4);
    ~p5; VectorWriteInt(E,i,j);
    ~p0; if (!LAST(p3)) goto Loop2;
    x += VECLEN;
Loop1Tail:
    p0 = (x < KSIZE) ;
    if ( FIRST (p0) ) goto Loop1 ;
```

Fig. 15

DYNAMIC ATTRIBUTE INFERENCE

BACKGROUND

1. Field of the Invention

This invention is related to the field of processors and, more specifically, to processors that execute predicated vector instructions.

2. Description of the Related Art

Vector processors exploit data-level parallelism (DLP) by performing the same operation on multiple vector elements on an input (source) operand or operands. In some vector instruction sets, multiple vector element sizes are supported. Not only are there sometimes multiple data types (e.g. integer, floating point, etc.) supported in the vectors, but also some data types may have multiple vector element sizes.

For some operations, the execution latency of the operation is dependent upon the number of elements in the vector. In many processors, instructions are launched from the scheduler before all of the input parameters are available. In cases where an instruction is launched before the number of vector elements is known to the scheduler, the latency of the instruction will be unknown at the time of launch. This complicates the scheduling of subsequent instructions (e.g. those subsequent instructions that are dependent on the instruction with unknown latency).

SUMMARY

In an embodiment, a processor may be configured to dynamically infer one or more attributes of input and/or output registers of an instruction, given the attributes corresponding to at least one input registers. The inference may be made at the issue circuit/stage of the processor, for those registers that do not have attribute information at the issue circuit/stage. In an embodiment, the processor may also include a register attribute tracker configured to track attributes of registers prior to the issue stage of the processor pipeline. The processor may feed back, to the register attribute tracker, inferred attributes and the register addresses of the registers to which the inferred attributes apply. The register attribute tracker may be configured to may associate the inferred attribute with the identified register attribute tracker may also be configured to infer input register attributes from other input register attributes. The dynamic inference of attributes may increase the number of registers for which attributes are known, which may improve overall scheduling accuracy for instructions in the case that execution latency depends on the attributes.

BRIEF DESCRIPTION OF THE DRAWINGS

The following detailed description makes reference to the accompanying drawings, which are now briefly described.

FIG. 11A is a diagram illustrating a sequence of variable states during scalar execution of the loop shown in Example 1.

FIG. 11B is a diagram illustrating a progression of execution for Macroscalar vectorized program code of the loop of Example 1.

FIG. 12A and FIG. 12B are diagrams illustrating one embodiment of the vectorization of program source code.

FIG. 13A is a diagram illustrating one embodiment of non-speculative vectorized program code.

FIG. 13B is a diagram illustrating another embodiment of speculative vectorized program code.

FIG. 14 is a diagram illustrating one embodiment of vectorized program code.

FIG. 15 is a diagram illustrating another embodiment of vectorized program code.

Figure 1:
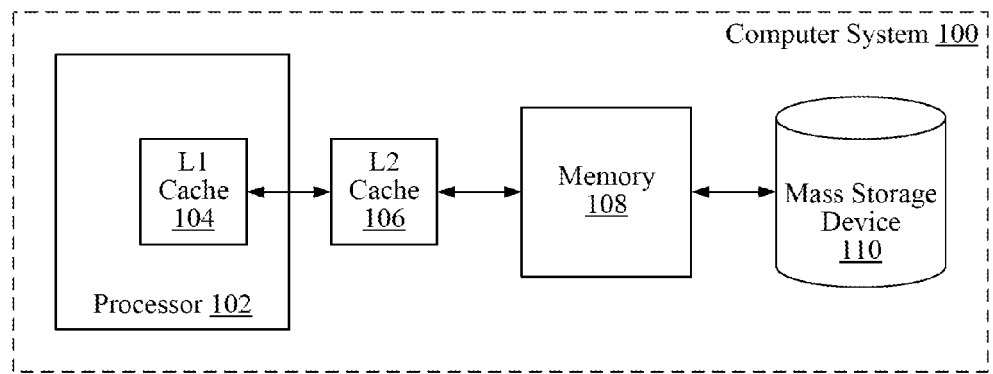
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Computer System Overview

Turning now to FIG. 1, a block diagram of one embodiment of a computer system is shown. Computer system 100 includes a processor 102, a level two (L2) cache 106, a memory 108, and a mass-storage device 110. As shown, processor 102 includes a level one (L1) cache 104. It is noted that although specific components are shown and described in computer system 100, in alternative embodiments different components and numbers of components may be present in computer system 100. For example, computer system 100 may not include some of the memory hierarchy (e.g., memory 108 and/or mass-storage device 110). Alternatively, although the L2 cache 106 is shown external to the processor 102, it is contemplated that in other embodiments, the L2 cache 106 may be internal to the processor 102. It is further noted that in such embodiments, a level three (L3) cache (not shown) may be used. In addition, computer system 100 may include graphics processors, video cards, video-capture devices, user-interface devices, network cards, optical drives, and/or other peripheral devices that are coupled to processor 102 using a bus, a network, or another suitable communication channel (all not shown for simplicity).

In various embodiments, processor 102 may be representative of a general-purpose processor that performs computational operations. For example, processor 102 may be a central processing unit (CPU) such as a microprocessor, a microcontroller, an application-specific integrated circuit (ASIC), or a field-programmable gate array (FPGA). As described further below, processor 102 may include one or more mechanisms for vector processing (e.g., vector execution units). The processor 102 may be a standalone component, or may be integrated onto an integrated circuit with other components (e.g. other processors, or other components in a system on a chip (SOC)). The processor 102 may be a component in a multichip module (MCM) with other components.

The mass-storage device 110, memory 108, L2 cache 106, and L1 cache 104 are storage devices that collectively form a memory hierarchy that stores data and instructions for processor 102. More particularly, the mass-storage device 110 may be a high-capacity, non-volatile memory, such as a disk drive or a large flash memory unit with a long access time, while L1 cache 104, L2 cache 106, and memory 108 may be smaller, with shorter access times. These faster semiconductor memories store copies of frequently used data. Memory 108 may be representative of a memory device in the dynamic random access memory (DRAM) family of memory devices. The size of memory 108 is typically larger than L1 cache 104 and L2 cache 106, whereas L1 cache 104 and L2 cache 106 are typically implemented using smaller devices in the static random access memories (SRAM) family of devices. In some embodiments, L2 cache 106, memory 108, and mass-storage device 110 are shared between one or more processors in computer system 100.

In some embodiments, the devices in the memory hierarchy (i.e., L1 cache 104, etc.) can access (i.e., read and/or write) multiple cache lines per cycle. These embodiments may enable more effective processing of memory accesses that occur based on a vector of pointers or array indices to non-contiguous memory addresses.

It is noted the data structures and program instructions (i.e., code) described below may be stored on a non-transitory computer-readable storage device, which may be any device or storage medium that can store code and/or data for use by a computer system (e.g., computer system 100). Generally speaking, a non-transitory computer-readable storage device includes, but is not limited to, volatile memory, non-volatile memory, magnetic and optical storage devices such as disk drives, magnetic tape, compact discs (CDs), digital versatile discs or digital video discs (DVDs), or other media capable of storing computer-readable media now known or later developed. As such, mass-storage device 110, memory 108, L2 cache 106, and L1 cache 104 are all examples of non-transitory computer readable storage devices.

Processor

Figure 2:
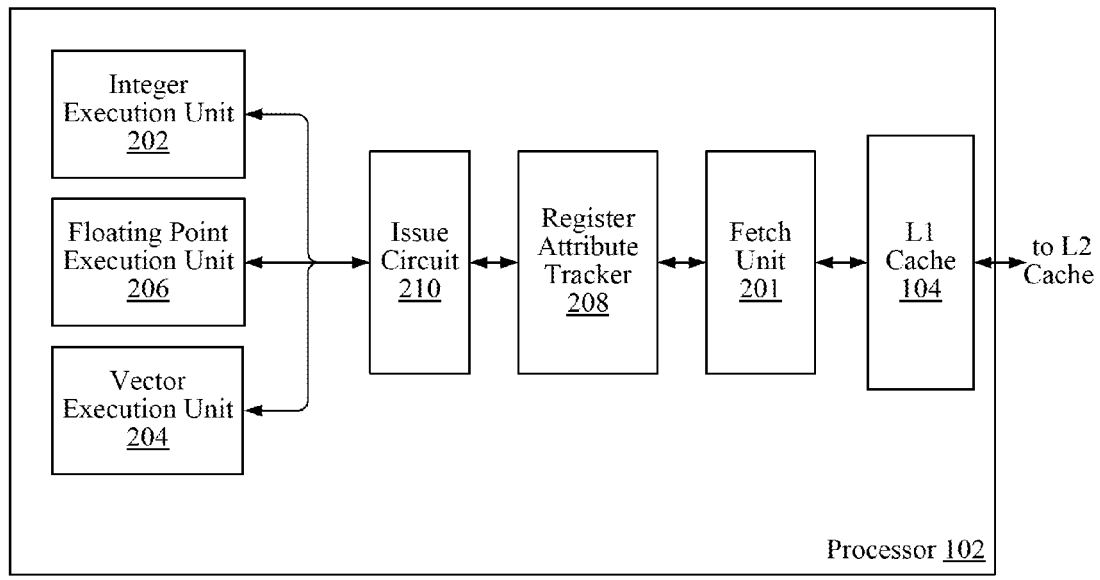
FIG. 2 is a block diagram illustrating additional details of an embodiment of the processor shown in FIG. 1.

Referring to FIG. 2, a block diagram illustrating additional details of an embodiment of the processor 102 of FIG. 1 is shown. In the embodiment shown in FIG. 2, the processor 102 may include a number of pipeline stages, although for brevity not all are shown in FIG. 2. In the illustrated embodiment, the processor 102 includes the L1 cache 104, an instruction fetch unit 201, a register attribute tracker 208, an issue circuit 210, an integer execution unit 202, a floating-point execution unit 206, and a vector execution unit 204. It is noted that the integer execution unit 202, floating-point execution unit 206, and vector execution unit 204 as a group may be interchangeably referred to as "the execution units."

The fetch unit 201 may be configured to fetch instructions from the L1 Cache 104. The fetch unit 201 may include various branch prediction mechanisms, next fetch predictors, and/or other speculative instruction stream mechanisms that permit fetching down a speculative instruction path to provide instructions for execution. The fetch unit 201 may include decode circuitry as well to decode the instructions, in some embodiments. An instruction stream may generally be a set of instructions arranged for execution to accomplish an overall task. The stream may be executed out-of-order if the processor 102 implements out of order processing. The stream may not necessarily be stored at consecutive addresses in memory, as branches and the like may cause fetching to continue at different addresses than the next sequential address.

An instruction may be an executable entity defined in an instruction set architecture implemented by the processor 102. There are a variety of instruction set architectures in existence (e.g. the x86 architecture original developed by Intel, ARM from ARM Holdings, Power and PowerPC from IBM/Motorola, etc.). Each instruction is defined in the instruction set architecture, including its coding in memory, its operation, and its effect on registers, memory locations, and/or other processor state. A given implementation of the instruction set architecture may execute each instruction directly, although its form may be altered through decoding and other manipulation in the processor hardware. Another implementation may decode at least some instructions into multiple instruction operations for execution by the execution units in the processor 102. Some instructions may be microcoded, in some embodiments. Accordingly, the term "instruction operation" may be used herein to refer to an operation that an execution unit in the processor 102 is configured to execute as a single entity. Instructions may have a one to one correspondence with instruction operations, and in some cases an instruction operation may be an instruction (possibly modified in form internal to the processor 102). Instructions may also have a one to more than one (one to many) correspondence with instruction operations. An instruction operation may be more briefly referred to herein as an "op."

In various embodiments, the execution units may perform computational operations such as logical operations, mathematical operations, or bitwise operations, for example, for an associated type of operand. More specifically, the integer execution unit 202 may perform computational operations that involve integer operands, the floating-point execution unit 206 may perform computational operations that involve floating-point operands, and the vector execution unit 204 may perform computational operations that involve vector operands. Any suitable configurations may be employed for the integer execution unit 202 and the floating-point execution unit 206, depending on the particular configuration of architectural and performance parameters governing a particular processor design. As noted above, although the embodiment of the processor 102 shown in FIG. 2 includes a particular set of components, it is contemplated that in alternative embodiments the processor 102 may include different numbers or types of execution units, functional units, and pipeline stages such as an instruction decode unit, a scheduler or reservations station, a reorder buffer, a memory management unit, I/O interfaces, etc. that may be coupled to the execution units.

The vector execution unit 204 may be representative of a single-instruction-multiple-data (SIMD) execution unit in the classical sense, in that it may perform the same operation on multiple data elements in parallel. However, it is noted that in some embodiments, the vector instructions described herein may differ from other implementations of SIMD instructions. For example, in an embodiment, elements of a vector operated on by a vector instruction may have a size that does not vary with the number of elements in the vector. By contrast, in some SIMD implementations, data element size does vary with the number of data elements operated on (e.g., a SIMD architecture might support operations on eight 8-bit elements, but only four 16-bit elements, two 32-bit elements, etc.). In one embodiment, the vector execution unit 204 may operate on some or all of the data elements that are included in vectors of operands. More particularly, the vector execution unit 204 may be configured to concurrently operate on different elements of a vector operand of a vector program instruction.

In one embodiment, the vector execution unit 204 may include a vector register file (not shown) that may include vector registers that can hold operand vectors and result vectors for the vector execution unit 204. In some embodiments, there may be 32 vector registers in the vector register file, and each vector register may include 128 bits. However, in alternative embodiments, there may be different numbers of vector registers and/or different numbers of bits per register. The vector registers may further include predicate vector registers that may store predicates for the vector instructions, and may also store one or more vector attributes as described in further detail below. Furthermore, embodiments which implement register renaming may include any number of physical registers that may be allocated to architected vector registers and architected predicate vector registers. Architected registers may be registers that are specifiable as operands in vector instructions.

The vector execution unit 204 may be configured to retrieve operands from the vector registers and to execute vector ops. Executing vector ops may include the vector execution unit 204 performing operations in parallel on some or all of the data elements in the operand vector. For example, the vector execution unit 204 may perform logical operations, mathematical operations, or bitwise operations on the elements in the vector. The vector execution unit 204 may perform one vector op per instruction cycle (although a "cycle" may include more than one clock cycle that may be used to trigger, synchronize, and/or control the vector execution unit 204's computational operations).

In one embodiment, the vector execution unit 204 may support vectors that hold N data elements (e.g., bytes, words, doublewords, etc.), where N may be any positive whole number. In these embodiments, the vector execution unit 204 may perform operations on N or fewer of the data elements in an operand vector in parallel. For example, in an embodiment where the vector is 256 bits in length, the data elements being operated on are four-byte elements, and the operation is adding a value to the data elements, these embodiments can add the value to any number of the elements in the vector. It is noted that N may be different for different implementations of the processor 102.

In some embodiments, as described in greater detail below, based on the values contained in a vector of predicates or one or more scalar predicates, the vector execution unit 204 applies vector operations to selected vector data elements only. In some embodiments, the remaining data elements in a result vector remain unaffected (which may also be referred to as "masking" or "masking predication") or are forced to zero (which may also be referred to as "zeroing" or "zeroing predication"). In some embodiments, the clocks for the data element processing subsystems ("lanes") that are unused due to masking or zeroing in the vector execution unit 204 can be power and/or clock-gated, thereby reducing dynamic power consumption in the vector execution unit 204. Generally a predicate may refer to a value that indicates whether or not an operation is to be applied to a corresponding operand value to produce a result. A predicate may, e.g., be a bit indicating that the operation is to be applied in one state and not applied in the other state. For example, the set state may indicate that the operation is to be applied and the clear state may indicate that the operation is not to be applied (or vice versa).

In various embodiments, the architecture may be vector-length agnostic to allow it to adapt parallelism at runtime. More particularly, when instructions or ops are vector-length agnostic, the operation may be executed using vectors of any length. A given implementation of the supporting hardware may define the maximum length for that implementation. For example, in embodiments in which the vector execution hardware supports vectors that can include eight separate four-byte elements (thus having a vector length of eight elements), a vector-length agnostic operation can operate on any number of the eight elements in the vector. On a different hardware implementation that supports a different vector length (e.g., four elements), the vector-length agnostic operation may operate on the different number of elements made available to it by the underlying hardware. Thus, a compiler or programmer need not have explicit knowledge of the vector length supported by the underlying hardware (e.g., the vector execution unit 204). In such embodiments, a compiler generates or a programmer writes program code that need not rely on (or use) a specific vector length. In some embodiments it may be forbidden to specify a specific vector size in program code. Thus, the compiled code in these embodiments (i.e., binary code) runs on other execution units that may have differing vector lengths, while potentially realizing performance gains from processors that support longer vectors. In such embodiments, the vector length for a given hardware unit such as a processor may be read from a system register during runtime. Consequently, as process technology allows longer vectors, execution of legacy binary code simply speeds up without any effort by software developers.

Generally, vector lengths may be implemented as powers of two (e.g., two, four, eight, etc.). However, in some embodiments, vector lengths need not be powers of two. Specifically, vectors of three, seven, or another number of data elements can be used in the same way as vectors with power-of-two numbers of data elements.

While the instruction set architecture may specify that vector instructions are vector length agnostic, vector attributes may be useful to the vector hardware. In an embodiment, the predicate vector registers may store both the predicates and one or more vector attributes for the corresponding vector operation. The vector attribute may generally specify any architected and/or implementation-specific size information. For example, in an embodiment, vector attributes may specify at least one of a vector element size (specifying one of a set of supported vector element sizes for a particular operation), vector size (e.g. size of the vector registers, e.g. in bits or bytes), number of vector elements per vector, number of elements per partition, number of partitions per vector, or partition size. A partition may be a subset of a vector on which certain operations are defined to operation. For example, a vector operation that reverses the order of the vector elements may operate on partitions within the vector register, reversing the order within each partition.

Figure 3:
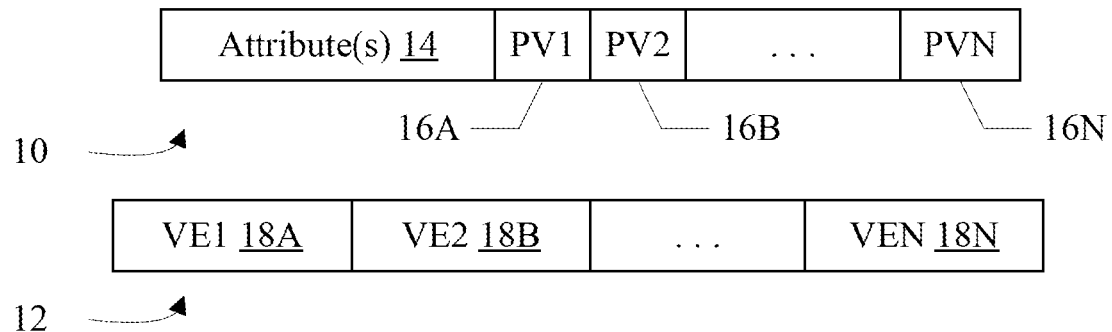
FIG. 3 is a block diagram of one embodiment of a predicate vector register and a vector register.

In an embodiment, the predicate vector registers may be architected to store one or more vector attributes, and the vector registers may store vector elements (N elements, where N is implementation-specific). FIG. 3 is a block diagram illustrating an exemplary predicate vector register 10 and an exemplary vector register 12 as architected according to one embodiment of the instruction set architecture implemented by the processor 102. As illustrated in FIG. 3, the predicate vector register 10 includes an attributes field 14 and N predicate fields 16A-16N. The N predicate fields correspond to the N vector element fields 18A-18N of the vector register 12.

While only the predicate vector registers are architected to store the vector attributes, tracking the vector attributes associated with the vector registers may be useful from a hardware point of view (e.g. the vector element size of the most recent write to that vector register may be tracked). For example, in some cases, the execution latency of certain ops may be dependent on the vector attributes. Examples may include vector operations the combine one vector element with each other vector element in an arithmetic or logic operation. Other examples may include cases in which the vector execution unit 204 does not include enough hardware to perform a given vector operation on all vector elements in parallel.

The register attribute tracker 208 may be provided for tracking vector attributes of predicate vector registers and, in some embodiments, vector registers as well. The register attribute tracker may be configured to receive the instructions (or instruction operations corresponding to the instructions) from the fetch unit 201 and may be configured to identify vector attributes and to associate vector attributes with registers used by the ops. The registers may be architected registers, or may be physical registers assigned to the architected registers by a register renamer.

More particularly, some vector instructions may explicitly define vector attributes. That is, the encoding of the instruction itself (e.g. the opcode, one or more other fields of the instruction such as an immediate field, etc.) may specify the vector attribute. For example, an embodiment includes predicate vector initialization instructions, which are defined to initialize predicate vector registers with true predicates (predicates which cause the corresponding vector elements to be operated upon, e.g. the set state) or false predicates (predicates which cause the corresponding vector elements to not be operated upon, e.g. the clear state). The predicate vector initialization instructions may also explicitly specify the vector attributes. In an embodiment, memory-referencing instructions may explicitly specify vector attributes. Memory-referencing instructions may include loads (which read data from memory into registers, although the read may be accomplished in cache) and stores (which write data from registers to memory, although the write may be accomplished in cache). Since the vector attributes may affect the amount of memory that is read/written (e.g. the number of consecutive bytes at each vector location), the memory-referencing instructions may explicitly identify the vector attributes. Thus, the ops corresponding to memory-referencing instructions and predicate vector initialization instructions may be detected by the register attribute tracker and the corresponding attribute or attributes may be tracked for the output register of the op by the register attribute tracker 208.

Additionally, if a source predicate register (or input predicate register) of an op that generates an output predicate (a "predicate-generating op") has a tracked attribute in the register attribute tracker 208, the register attribute tracker 208 may be configured to associate an attribute with a target or destination predicate register (output predicate register) of that op. The attribute may be the same as the tracked attribute, in some cases. In other cases, the attribute may be a function of the defined operation to be performed by the processor 102 in response to the instruction operation. For example, an embodiment may pack or unpack predicates based on a change in size of corresponding vector elements, and the attribute to be associated with the output predicate register may reflect the change in size as well as the tracked attribute.

In an embodiment, the frequency at which register attributes may be determined and tracked may be increased by also tracking the attributes with respect to vector registers. Accordingly, in an embodiment, the register attribute tracker 208 may be configured to track attributes for the vector registers even though the vector registers may not have an attribute architecturally. Again, the attribute of the output register may be equal to the tracked attribute of the input register or may be a function of the defined instruction operation and the tracked attribute.

The register attribute tracker 208 may not always be able to determine a tracked attribute for a given vector register. For example, if predicate register values are read from memory, the corresponding attributes may not be determined until the memory read occurs. To handle such cases, the register attribute tracker 208 and/or the issue circuit 210 may be configured to dynamically infer the vector attributes for registers of the instruction operation, given the vector attributes corresponding to one input register. The inferred attribute may be equal to the known attribute, or a function of the attribute and the defined instruction operation in the case of the output register of the instruction operation.

The issue circuit 210 may be coupled to receive ops and may be configured to schedule ops for execution by the execution units. Generally, the issue circuit 210 may be configured to monitor the ops held by the issue circuit 210, identifying ops for which the input operands are "ready" and scheduling the oldest ops that are ready and for which execution resources (e.g. execution units) are available to execute the ops. Particularly, based on the execution latency of a given op, the issue circuit 210 may determine when the ops that depend on the output register of the given op are ready (at least with respect to the dependency on the given op). The dependent ops may be scheduled, at the earliest, such that they arrive at the execution stage at a time when the input operands may be forwarded to the execution state. There may be one or more pipeline stages between issue and execution (e.g. a register file read stage) and the ops may be scheduled based on the pipeline delays as well as the execution latency of the ops providing the operands.

For vector ops having execution latencies that depend on a vector attribute, the issue circuit 210 may use the vector attribute in making scheduling decisions. In cases in which the op explicitly defines the vector attribute, the op has been annotated with the attribute, or the attribute otherwise accompanies the op (e.g. pre-read from a predicate vector register), the vector attribute is available to the issue circuit 210. In other cases, the issue circuit 210 may be configured to dynamically infer the vector attribute from the vector attribute corresponding to one of the input registers. For example, the vector attribute may be inferred from the attribute associated with an input (non-predicate) vector register as provided from the register attribute tracker 208 or otherwise detected with respect to an input register of the vector op. The inferred attribute may be equal to the detected attribute, or may be a function of the attribute and the defined operation associated with the vector op.

Generally, an issue circuit may be any circuitry configured to receive ops and schedule the ops for execution. An issue circuit may be centralized (e.g. a centralized scheduler or centralized reservation station) that schedules ops for execution in all execution units. An issue circuit may also be decentralized (e.g. reservation stations) that receive and schedule ops of a particular type and/or ops for a particular execution unit. Any issue circuitry may be implemented in various embodiments.

It is noted that, while the embodiment described above tracks vector attributes for vector registers, other embodiments are contemplated in which any attributes may be tracked with respect to any registers (e.g. floating point, integer, etc.).

The L1 cache 104 may be illustrative of any caching structure. For example, the L1 cache 104 may be implemented as a Harvard architecture (separate instruction cache for instruction fetching by the fetch unit 201 and data cache for data read/write by execution units for memory-referencing ops), as a shared instruction and data cache, etc. In some embodiments, load/store execution units may be provided to execute the memory-referencing ops. The load/store execution units may be coupled to the issue circuit 210 and to the data L1 cache.

In various embodiments, each data element in the vector may contain an address that is used by the vector execution unit 204 for performing a set of memory accesses in parallel. In such embodiments, if one or more elements of the vector contain invalid memory addresses, invalid memory-read operations can occur. Accordingly, invalid memory-read operations that would otherwise result in program termination may instead cause any elements with valid addresses to be read and elements with invalid elements to be flagged, allowing program execution to continue in the face of speculative, and in hindsight illegal, read operations.

In some embodiments, the processor 102 (and hence the vector execution unit 204) is able to operate on and use vectors of pointers. In such embodiments, the number of data elements per vector is the same as the number of pointers per vector, regardless of the size of the data type. Instructions that operate on memory may have variants that indicate the size of the memory access, but elements in processor registers should be the same as the pointer size. In these embodiments, processors that support both 32-bit and 64-bit addressing modes may choose to allow twice as many elements per vector in 32-bit mode, thereby achieving greater throughput. This implies a distinct throughput advantage to 32-bit addressing, assuming the same width data path. Implementation-specific techniques can be used to relax the requirement. For example, double-precision floating-point numbers can be supported in 32-bit mode through register pairing or some other specialized mechanism.

Figure 4:
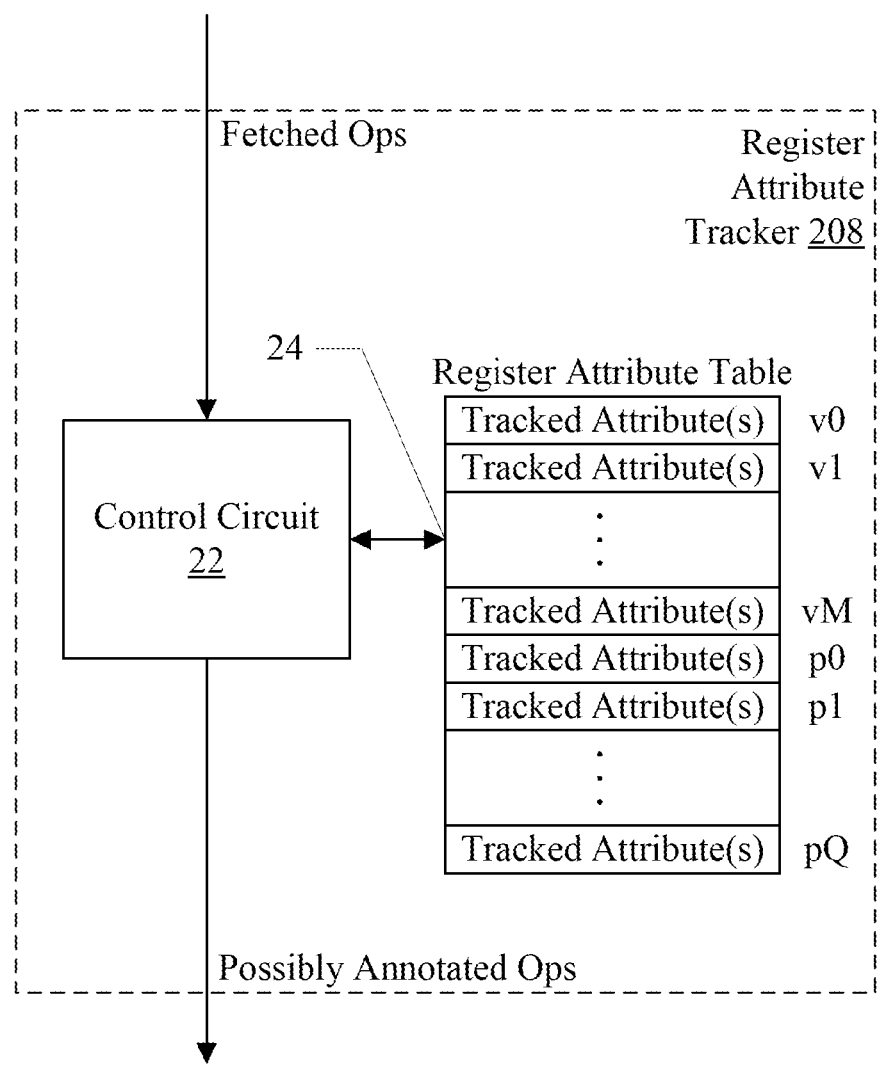
FIG. 4 is a block diagram of one embodiment of a register attribute tracker shown in FIG. 2.

FIG. 4 is a block diagram of one embodiment of the register attribute tracker 208. In the illustrated embodiment, the register attribute tracker 208 includes a control circuit 22 and a register attribute table 24. The control circuit 22 may be coupled to receive the fetched ops from the fetch unit 201, coupled to the register attribute table 24, and coupled to provide the possibly annotated ops to the issue circuit 210.

The register attribute table 24 may include an entry for each predicate vector register (e.g. registers p0 to pQ, where Q is an integer greater than 0). The entry may store one or more tracked attributes associated with the predicate vector register, if any. For example, the entry may include a valid bit indicating whether or not the entry is valid, and the tracked attribute(s) if the entry is valid. Initially, the valid bit may indicate invalid for each entry. As ops pass through the control circuit 22, the valid bits may be changed to valid by the control circuit 22 and the corresponding attribute(s) may be written to the entry by the control circuit 22 in response to the corresponding register being an output register of the op (or an input register, in the case that the register attribute tracker 208 is also configured to infer attributes for input registers). In an embodiment, there may be one vector attribute (e.g. a vector element size), although other embodiments may include more than one vector attribute or may vary the vector attribute.

In the illustrated embodiment, the register attribute tracker 208 may further track the vector attributes associated with the vector registers (e.g. registers v0 to vM, where M is an integer greater than 0). M and Q may be different integers, or the same integer, depending on the number of architected registers of each type defined in the instruction set architecture (if the register attribute tracker 208 tracks architected registers) or the number of physical registers implemented by the processor 102 (if the register attribute tracker 208 tracks physical registers).

The register attribute table 24 may be formed out of any type of storage devices. For example, the register attribute table 24 may be formed from static random access memory (SRAM), registers, latches, flops, or any other clocked storage devices.

Figure 5:
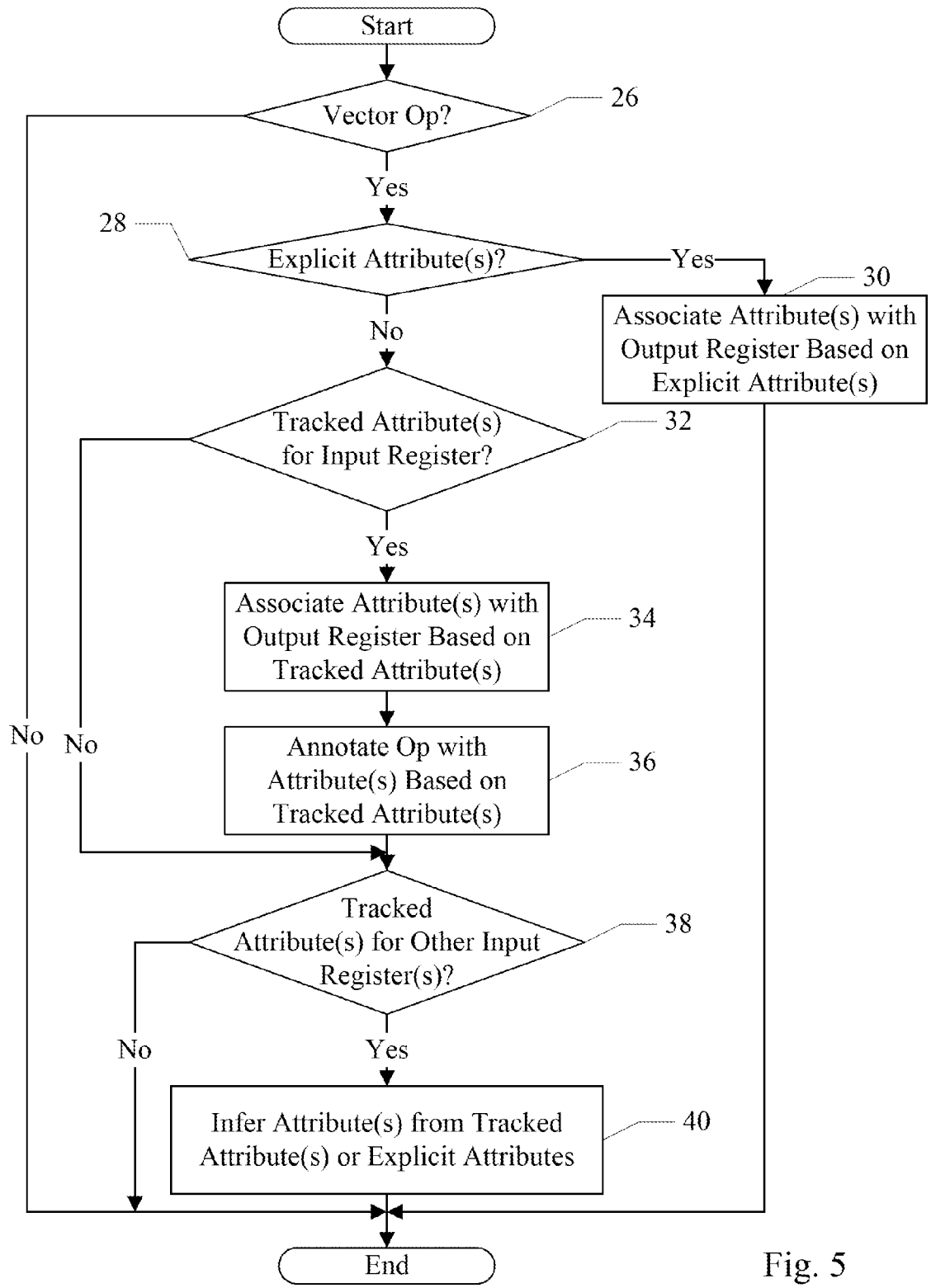
FIG. 5 is a flowchart illustrating operation of one embodiment of the register attribute tracker.

FIG. 5 is a flowchart illustrating operation of one embodiment of the register attribute tracker 208 (and more particularly the control circuit 22 in FIG. 4, for one embodiment). While the blocks are shown in a particular order for ease of understanding, other orders may be used. Blocks may be performed in parallel in combinatorial logic within the register attribute tracker 208/control circuit 22. Blocks, combinations of blocks, and/or the flowchart as a whole may be pipelined over multiple clock cycles.

The flowchart shown in FIG. 5 illustrates operation of the circuitry for one op. In some embodiments, several ops may be received in parallel in a clock cycle. The circuitry represented in FIG. 5 may operate on the ops in parallel, and may pass dependency information between the parallel processed ops as needed to correctly process each op.

If the op is not a vector op, the op may be passed through the register attribute tracker 208 unmodified (decision block 26, "no" leg). The register attribute table 24 may also be unmodified with respect to the non-vector op. If the op is a vector op (decision block 26, "yes" leg) and explicitly defines a vector attribute (decision block 28, "yes" leg), the register attribute tracker 208 may be configured to associate the attribute (or an attribute derived from the attribute and a defined operation of the vector op) with the output register of the op (block 30). For example, in the embodiment of FIG. 4, the control circuit 22 may be configured to update the entry in the register attribute table 24 corresponding to the output register of the op with the attribute explicitly defined by the op. If the op is a vector op (decision block 26, "yes" leg), does not explicitly define a vector attribute (decision block 28, "no" leg) but does have a tracked attribute associated with an input predicate vector register of the op (decision block 32, "yes" leg), the register attribute tracker 208 may be configured to associate the tracked attribute (or an attribute derived from the tracked attribute and a defined operation of the vector op) with the output register of the op (block 34). For example, the control circuit 22 may be configured to derive the attribute from the tracked attribute, and may be configured to write the entry corresponding to the output register in the register attribute table 24. In one embodiment, the attributes may be tracked for predicate vector output registers and the attribute may be tracked for an output predicate vector register of the op (if any). In other embodiments, the register attribute tracker 208 also may be configured to track attributes for vector input and output registers, and the operation of blocks 30-34 may apply to vector registers and well as predicate vector registers. Additionally, the register attribute tracker 208/control circuit 22 may be configured to annotate the op with the tracked attribute (block 36).

Embodiments that implement inferred attributes may also be configured to detect that an attribute is associated with an input register than is not the input predicate vector register of the op (decision block 38, "yes" leg), and may be configured to associate a tracked attribute with an output register of the op and/or other input registers of the op by inferring the attribute from the attribute of the input register (block 40). For example, the control circuit 22 may be configured to read the tracked attribute from the entry of the register attribute table 24 corresponding to the input register and may update the register attribute table 24 at the entries corresponding to the input predicate register and/or output register of the op.

Figure 6:
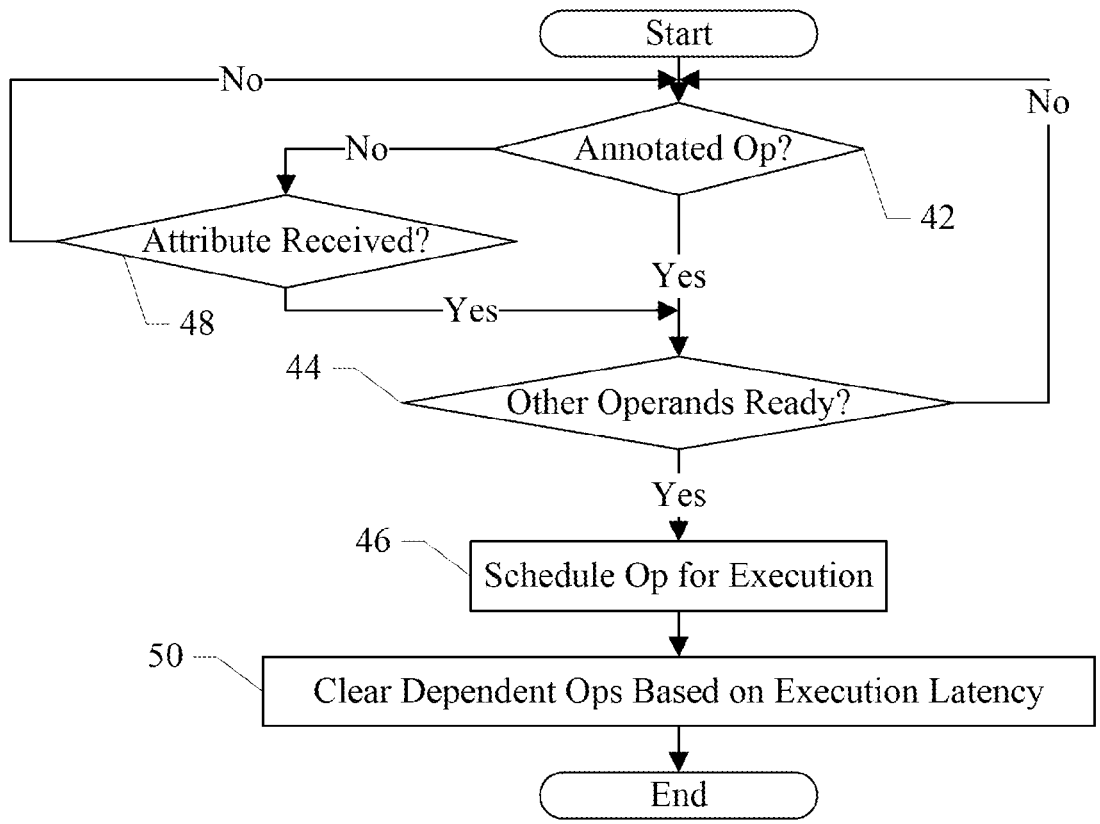
FIG. 6 is a flowchart illustrating operation of one embodiment of an issue circuit shown in FIG. 2.

FIG. 6 is a flowchart illustrating operation of one embodiment of the issue circuit 210. While the blocks are shown in a particular order for ease of understanding, other orders may be used. Blocks may be performed in parallel in combinatorial logic within the issue circuit 210. Blocks, combinations of blocks, and/or the flowchart as a whole may be pipelined over multiple clock cycles.

The flowchart shown in FIG. 6 illustrates operation of the issue circuit 210 for one vector op stored therein. The issue circuit 210 may operate on the stored vector ops in parallel, and thus may implement the shown in FIG. 6 in parallel for each vector op. In the event that more than one vector op is schedulable for the same vector execution unit/pipeline, the oldest op of the schedulable ops may be selected.

If the vector op is annotated with the vector attribute, or explicitly defines the vector attribute (decision block 42, "yes" leg) and the other operands of the op are ready (decision block 44, "yes" leg), the issue circuit 210 may be configured to schedule the op for execution (block 46). If the op is not annotated (decision block 42, "no" leg) and the attribute for the op has been received via forwarding from a previous op (decision block 48, "yes" leg), and if the other operands are ready (decision block 44, "yes" leg), the issue circuit 210 may be configured to schedule the op for execution (block 46). Additionally, based on the execution latency of the op (which may depend on the vector attribute of the op), the issue circuit 210 may be configured to clear the dependency of other ops that depend on the scheduled op (block 50).

Operands may be "ready" if the operands have been written to their destination registers or if the operands will be forwarded to the dependent ops prior to or coincident with execution. Various embodiments may determine "ready" differently based on forwarding capabilities.

Figure 7:
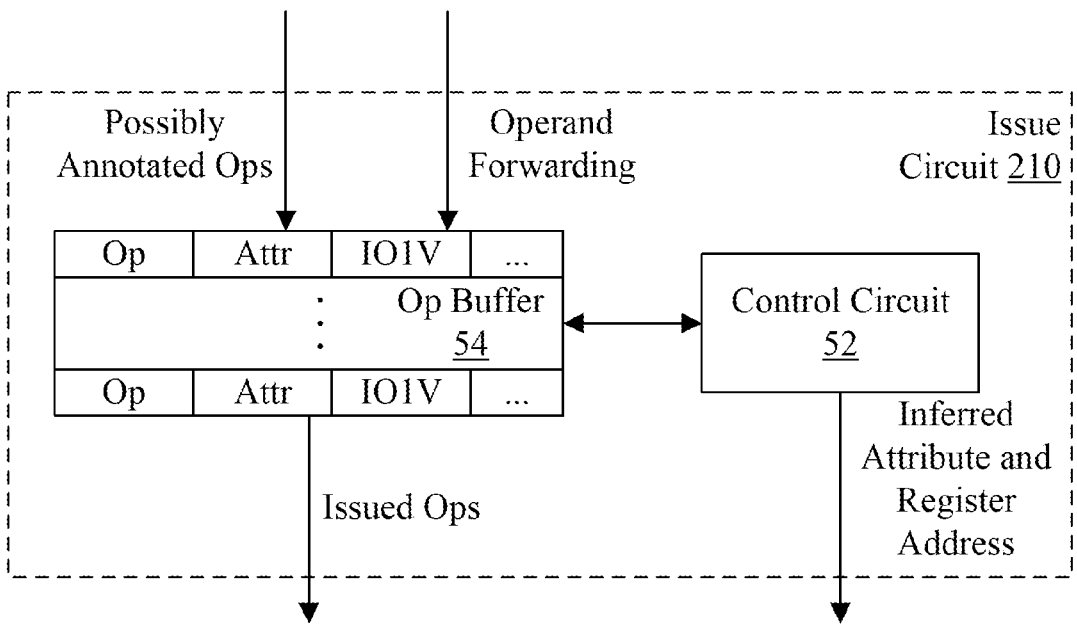
FIG. 7 is a block diagram of one embodiment of the issue circuit shown in FIG. 2.

FIG. 7 is a block diagram of one embodiment of the issue circuit 210 that implements vector attribute inference is shown. In the illustrated embodiment, the issue circuit 210 includes a control circuit 52 and an op buffer 54. The op buffer 54 may be coupled to the control circuit 52, and may be coupled to receive the (possibly annotated) ops output from the register attribute tracker 208 and operand forwarding information from various execution units. The op buffer 54 is configured to transmit issue ops to execution unit(s) for execution. The control circuit 52 is configured to transmit inferred attribute and register address information to the register attribute tracker 208.

The op buffer 54 may include an entry for each op that may be concurrently stored therein. Exemplary op buffer entries illustrated in FIG. 7 include an op field for the op itself, an attribute field (Attr) for the annotated attribute or inferred attribute, and various valid fields for other operands (e.g. IO1V for input operand 1, etc.).

In response to receiving an op, the control circuit 52 may allocate an entry in the op buffer 54 to store the op and related data. The op may be written to the op field in the allocated entry. If the op is annotated, the attribute may be written to the attribute field. The operand valid fields may be initialized based on information provided with the op (e.g. from a register renamer) indicating which input registers were previously written with results. In some embodiments, the issue circuit 210 may be in the pipeline after the register file read stage, and the op buffer 54 may further include storage for the operands themselves. In other embodiments, the issue circuit 210 may be in the pipeline before the register file read stage.

The issue circuit 210 may be configured to receive operand forwarding information from execution units, in some embodiments. The operand forwarding information may include the register address for which data is being forwarded (or will be forwarded in a subsequent clock cycle at a forwarding stage between the execution units and the issue circuit 210), and may optionally include the forwarded data for cases in which the op buffer 54 stores the forwarded data. The forwarded information may further include the vector attribute of the executed op. The control circuit 52 may update the valid fields in the op buffer entries based on the forwarding information and matching forwarded register addresses to register addresses of the stored ops.

Additionally, if attribute information is provided with the forwarded operands and the attribute of an op that depends on the forwarded operands has not be captured yet, the control circuit 52 may be configured to infer the attribute from the forwarded attribute. The inferred attribute may be the same as the forwarded attribute, or may be a function of the forwarded attribute and the defined operation of the op. The control circuit 52 may be configured to forward the inferred attributed (and the register address of the register to which it applies) to the register attribute tracker 208 for update as well.

The op buffer 54 may be formed out of any type of storage devices. For example, the op buffer 54 may be formed from SRAM, registers, latches, flops, or any other clocked storage devices.

It is noted that, while some embodiments of the issue circuit 210 may operate in conjunction with the register attribute tracker 208, other embodiments may implement the attribute inference features described above in processors that do not include the register attribute tracker 208. In such embodiments, the issue circuit 210 may not transmit the inferred attributes (except in distributed embodiments, in which case the inferred attributes may be exchanged among the distributed components of the issue circuit.

Figure 8:
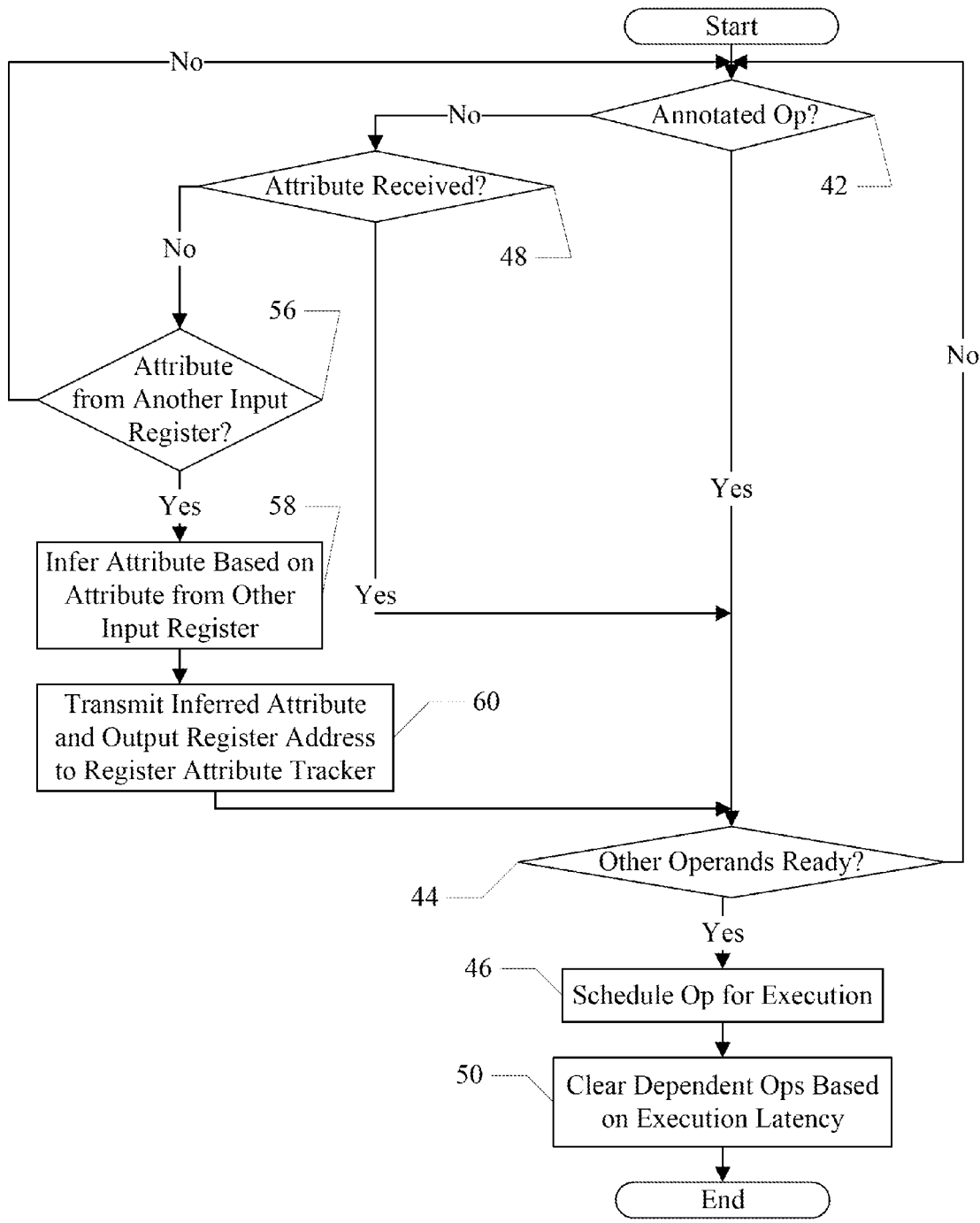
FIG. 8 is flowchart illustrating operation of one embodiment of the issue circuit.

FIG. 8 is a flowchart illustrating operation of one embodiment of the issue circuit 210 (and more particularly the control circuit 52, in an embodiment) is shown. While the blocks are shown in a particular order for ease of understanding, other orders may be used. Blocks may be performed in parallel in combinatorial logic within the issue circuit 210/control circuit 52. Blocks, combinations of blocks, and/or the flowchart as a whole may be pipelined over multiple clock cycles.

Similar to the operation illustrated in FIG. 6, the issue circuit 210/control circuit 52 may be configured to issue ops if the ops were annotated and/or the attribute was previously received (or inferred) and the other operand are ready (blocks 42-50). Also similar to FIG. 6, the operation of the flowchart shown in FIG. 8 illustrates operation of the issue circuit 210/control circuit 52 for one vector op stored therein. The issue circuit 210 may operate on the stored vector ops in parallel, and thus may implement the shown in FIG. 8 in parallel for each vector op. In the event that more than one vector op is schedulable for the same vector execution unit/pipeline, the oldest op of the schedulable ops may be selected.

Additionally, if the op was not annotated (decision block 42, "no" leg) and the attribute was not previously received (decision block 48, "no" leg), the control circuit 52 may be configured to detect that an attribute is forwarded with respect to an input register of the op (decision block 56, "yes" leg). The control circuit 52 may be configured infer the attribute of the ops based on the forwarded attribute (block 58). The control circuit 52 may be configured to update the attribute field of the entry corresponding to the op in the op buffer 54 with the inferred attribute. Additionally, the control circuit 52 may transmit (feed back) the inferred attribute along with the output register address of the op to register attribute tracker 208 (block 60).

Figure 9:
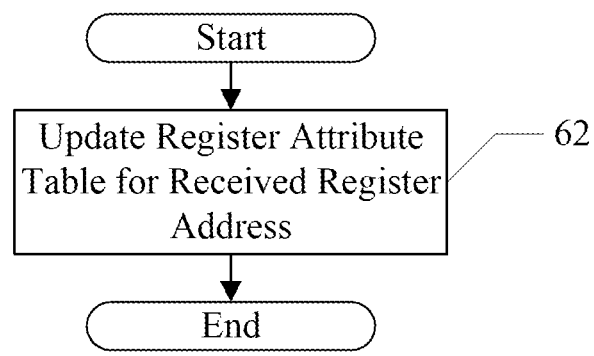
FIG. 9 is a flowchart illustrating operation of one embodiment of the register attribute tracker.

FIG. 9 is a flowchart illustrating operation of one embodiment of the register attribute tracker 208/control circuit 22 in response to receiving an inferred attribute fed back from the issue circuit 210. The control circuit 22 may update the entry in the register attribute table 24 corresponding to the register address provided from the issue circuit 210 with the inferred attribute received from the issue circuit 210 (block 62).

Macroscalar Architecture Overview

An instruction set architecture (referred to as the Macroscalar Architecture) and supporting hardware may allow compilers to generate program code for loops without having to completely determine parallelism at compile-time, and without discarding useful static analysis information. Various embodiments of the Macroscalar Architecture will now be described. Specifically, as described further below, a set of instructions is provided that does not mandate parallelism for loops but, instead, enables parallelism to be exploited at runtime if dynamic conditions permit. Accordingly, the architecture includes instructions that enable code generated by the compiler to dynamically switch between non-parallel (scalar) and parallel (vector) execution for loop iterations depending on conditions at runtime by switching the amount of parallelism used.

Thus, the architecture provides instructions that enable an undetermined amount of vector parallelism for loop iterations but do not require that the parallelism be used at runtime. More specifically, the architecture includes a set of vector-length agnostic instructions whose effective vector length can vary depending on runtime conditions. Thus, if runtime dependencies demand non-parallel execution of the code, then execution occurs with an effective vector length of one element. Likewise, if runtime conditions permit parallel execution, the same code executes in a vector-parallel manner to whatever degree is allowed by runtime dependencies (and the vector length of the underlying hardware). For example, if two out of eight elements of the vector can safely execute in parallel, a processor such as processor 102 may execute the two elements in parallel. In these embodiments, expressing program code in a vector-length agnostic format enables a broad range of vectorization opportunities that are not present in existing systems.

In various embodiments, during compilation, a compiler first analyzes the loop structure of a given loop in program code and performs static dependency analysis. The compiler then generates program code that retains static analysis information and instructs a processor such as processor 102, for example, how to resolve runtime dependencies and to process the program code with the maximum amount of parallelism possible. More specifically, the compiler may provide vector instructions for performing corresponding sets of loop iterations in parallel, and may provide vector-control instructions for dynamically limiting the execution of the vector instructions to prevent data dependencies between the iterations of the loop from causing an error. This approach defers the determination of parallelism to runtime, where the information on runtime dependencies is available, thereby allowing the software and processor to adapt parallelism to dynamically changing conditions. An example of a program code loop parallelization is shown in FIG. 10.

Figure 10:
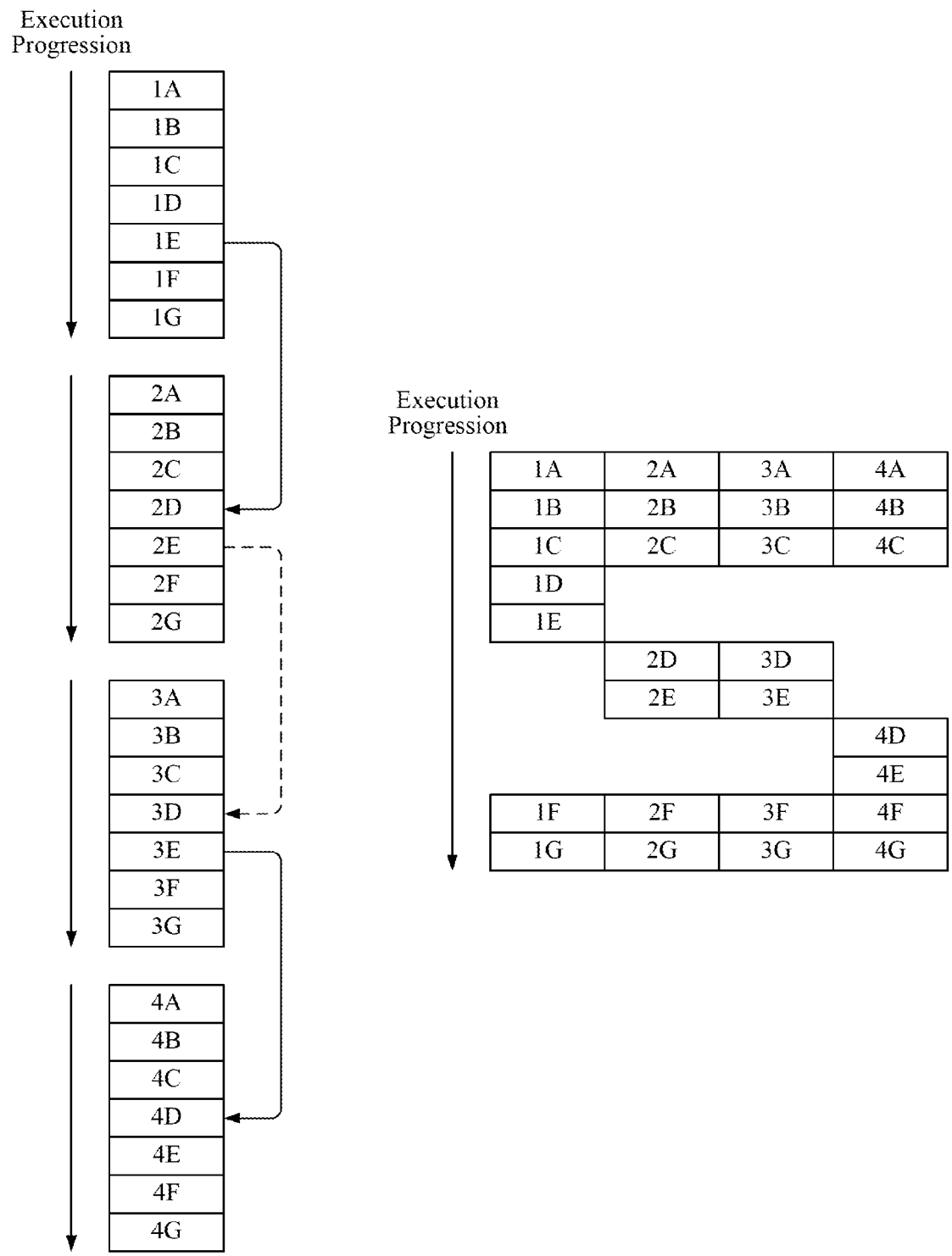
FIG. 10 is a diagram illustrating an example parallelization of a program code loop.

Referring to the left side of FIG. 10, an execution pattern is shown with four iterations (e.g., iterations 1-4) of a loop that have not been parallelized, where each loop includes instructions A-G. Serial operations are shown with instructions vertically stacked. On the right side of FIG. 10 is a version of the loop that has been parallelized. In this example, each instruction within an iteration depends on at least one instruction before it, so that there is a static dependency chain between the instructions of a given iteration. Hence, the instructions within a given iteration cannot be parallelized (i.e., instructions A-G within a given iteration are always serially executed with respect to the other instructions in the iteration). However, in alternative embodiments the instructions within a given iteration may be parallelizable.

As shown by the arrows between the iterations of the loop in FIG. 10, there is a possibility of a runtime data dependency between instruction E in a given iteration and instruction D of the subsequent iteration. However, during compilation, the compiler can only determine that there exists the possibility of data dependency between these instructions, but the compiler cannot tell in which iterations dependencies will actually materialize because this information is only available at runtime. In this example, a data dependency that actually materializes at runtime is shown by the solid arrows from 1E to 2D, and 3E to 4D, while a data dependency that doesn't materialize at runtime is shown using the dashed arrow from 2E to 3D. Thus, as shown, a runtime data dependency actually occurs between the first/second and third/fourth iterations.

Because no data dependency exists between the second and third iterations, the second and third iterations can safely be processed in parallel. Furthermore, instructions A-C and F-G of a given iteration have dependencies only within an iteration and, therefore, instruction A of a given iteration is able to execute in parallel with instruction A of all other iterations, instruction B can also execute in parallel with instruction B of all other iterations, and so forth. However, because instruction D in the second iteration depends on instruction E in the first iteration, instructions D and E in the first iteration must be executed before instruction D for the second iteration can be executed.

Accordingly, in the parallelized loop on the right side, the iterations of such a loop are executed to accommodate both the static and runtime data dependencies, while achieving maximum parallelism. More particularly, instructions A-C and F-G of all four iterations are executed in parallel. But, because instruction D in the second iteration depends on instruction E in the first iteration, instructions D and E in the first iteration must be executed before instruction D for the second iteration can be executed. However, because there is no data dependency between the second and third iterations, instructions D and E for these iterations can be executed in parallel.

Examples of the Macroscalar Architecture

The following examples introduce Macroscalar operations and demonstrate their use in vectorizing loops such as the loop shown in FIG. 10 and described above in the parallelized loop example. For ease of understanding, these examples are presented using pseudocode in the C++ format.

It is noted that the following example embodiments are for discussion purposes. The instructions and operations shown and described below are merely intended to aid an understanding of the architecture. However, in alternative embodiments, instructions or operations may be implemented in a different way, for example, using a microcode sequence of more primitive operations or using a different sequence of sub-operations. Note that further decomposition of instructions is avoided so that information about the macro-operation and the corresponding usage model is not obscured.

Notation

In describing the below examples, the following format is used for variables, which are vector quantities unless otherwise noted:

p5=a<b;

Elements of vector p5 are set to 0 or 1 depending on the result of testing a<b. Note that vector p5 may be a "predicate vector," as described in more detail below. Some instructions that generate predicate vectors also set processor status flags to reflect the resulting predicates. For example, the processor status flags or condition-codes can include the FIRST, LAST, NONE, and/or ALL flags.

~p5; a=b+c;

Only elements in vector 'a' designated by active (i.e., non-zero) elements in the predicate vector p5 receive the result of b+c. The remaining elements of a are unchanged. This operation is called "masking predication," and is denoted using the tilde ("~") sign before the predicate vector.

!p5; a=b+c;

Only elements in vector 'a' designated by active (i.e., non-zero) elements in the predicate vector p5 receive the result of b+c. The remaining elements of a are set to zero. This operation is called "zeroing," and is denoted using the exclamation point ("!") sign before the predicate vector.

--- if (FIRST( )) goto ..; // Also LAST( ), ANY( ),
ALL( ), CARRY( ), ABOVE( ), or NONE( ), (where ANY(
) == !NONE( ))

---

The following instructions test the processor status flags and branch accordingly.

x+=VECLEN;

VECLEN is a machine value that communicates the number of elements per vector. The value is determined at runtime by the processor executing the code, rather than being determined by the assembler.

//Comment

In a similar way to many common programming languages, the following examples use the double forward slash to indicate comments. These comments can provide information regarding the values contained in the indicated vector or explanation of operations being performed in a corresponding example.

In these examples, other C++-formatted operators retain their conventional meanings, but are applied across the vector on an element-by-element basis. Where function calls are employed, they imply a single instruction that places any value returned into a destination register. For simplicity in understanding, all vectors are vectors of integers, but alternative embodiments support other data formats.

Structural Loop-Carried Dependencies

In the code Example 1 below, a program code loop that is "non-vectorizable" using conventional vector architectures is shown. (Note that in addition to being non-vectorizable, this loop is also not multi-threadable on conventional multi-threading architectures due to the fine-grain nature of the data dependencies.) For clarity, this loop has been distilled to the fundamental loop-carried dependencies that make the loop unvectorizable.

In this example, the variables r and s have loop-carried dependencies that prevent vectorization using conventional architectures. Notice, however, that the loop is vectorizable as long as the condition (A[x]<FACTOR) is known to be always true or always false. These assumptions change when the condition is allowed to vary during execution (the common case). For simplicity in this example, we presume that no aliasing exists between A[ ] and B[ ].

Example 1

---

Program Code Loop r = 0;
s = 0;
for (x=0; x<KSIZE; ++x)
{
    if (A[x] < FACTOR)
    {
        r = A[x+s];
    }
    else
    {
        s = A[x+r];
    }
    B[x] = r + s;
}

---

Using the Macroscalar architecture, the loop in Example 1 can be vectorized by partitioning the vector into segments for which the conditional (A[x]<FACTOR) does not change. Examples of processes for partitioning such vectors, as well as examples of instructions that enable the partitioning, are presented below. It is noted that for this example the described partitioning need only be applied to instructions within the conditional clause. The first read of A[x] and the final operation B[x]=r+s can always be executed in parallel across a full vector, except potentially on the final loop iteration.

Instructions and examples of vectorized code are shown and described to explain the operation of a vector processor such as processor 102 of FIG. 2, in conjunction with the Macroscalar architecture. The following description is generally organized so that a number of instructions are described and then one or more vectorized code samples that use the instructions are presented. In some cases, a particular type of vectorization issue is explored in a given example.

dest=VectorReadInt(Base, Offset)

VectorReadInt is an instruction for performing a memory read operation. A vector of offsets, Offset, scaled by the data size (integer in this case) is added to a scalar base address, Base, to form a vector of memory addresses which are then read into a destination vector. If the instruction is predicated or zeroed, only addresses corresponding to active elements are read. In the described embodiments, reads to invalid addresses are allowed to fault, but such faults only result in program termination if the first active address is invalid.

VectorWriteInt(Base, Offset, Value)

VectorWriteInt is an instruction for performing a memory write operation. A vector of offsets, Offset, scaled by the data size (integer in this case) is added to a scalar base address, Base, to form a vector of memory addresses. A vector of values, Value, is written to these memory addresses. If this instruction is predicated or zeroed, data is written only to active addresses. In the described embodiments, writes to illegal addresses always generate faults.

dest=VectorIndex(Start, Increment)

VectorIndex is an instruction for generating vectors of values that monotonically adjust by the increment from a scalar starting value specified by Start. This instruction can be used for initializing loop index variables when the index adjustment is constant. When predication or zeroing is applied, the first active element receives the starting value, and the increment is only applied to subsequent active elements. For example:

x=VectorIndex(0,1); // x={0 1 2 3 4 5 6 7} dest=PropagatePostT(dest, src, pred)

The PropagatePostT instruction propagates the value of active elements in src, as determined by pred, to subsequent inactive elements of dest. Active elements, and any inactive elements that precede the first active element, remain unchanged in dest. The purpose of this instruction is to take a value that is conditionally calculated, and propagate the conditionally calculated value to subsequent loop iterations as occurs in the equivalent scalar code. For example:

| Entry: | dest | = {8 9 A B C D E F} |
| | src | = {1 2 3 4 5 6 7 8} |
| | pred | = {0 0 1 1 0 0 1 0} |
| Exit: | dest | = {8 9 A B 4 4 E 7} | dest=PropagatePriorF(src, pred)

The PropagatePriorF instruction propagates the value of the inactive elements of src, as determined by pred, into subsequent active elements in dest. Inactive elements are copied from src to dest. If the first element of the predicate is active, then the last element of src is propagated to that position. For example:

| Entry: | src | = {1 2 3 4 5 6 7 8} |
| | pred | = {1 0 1 1 0 0 1 0} |
| Exit: | dest | = {8 2 2 2 5 6 6 8} | dest=ConditionalStop(pred, deps)

The ConditionalStop instruction evaluates a vector of predicates, pred, and identifies transitions between adjacent predicate elements that imply data dependencies as specified by deps. The scalar value deps can be thought of as an array of four bits, each of which designates a possible transition between true/false elements in pred, as processed from left to right. These bits convey the presence of the indicated dependency if set, and guarantee the absence of the dependency if not set. They are:

kTF—Implies a loop-carried dependency from an iteration for which the predicate is true, to the subsequent iteration for which the value of the predicate is false.

kFF—Implies a loop-carried dependency from an iteration for which the predicate is false, to the subsequent iteration for which the value of the predicate is false.

kFT—Implies a loop-carried dependency from an iteration for which the predicate is false, to the subsequent iteration for which the value of the predicate is true.

kTT—Implies a loop-carried dependency from an iteration for which the predicate is true, to the subsequent iteration for which the value of the predicate is true.

The element position corresponding to the iteration that generates the data that is depended upon is stored in the destination vector at the element position corresponding to the iteration that depends on the data. If no data dependency exists, a value of 0 is stored in the destination vector at that element. The resulting dependency index vector, or DIV, contains a vector of element-position indices that represent dependencies. For the reasons described below, the first element of the vector is element number 1 (rather than 0).

As an example, consider the dependencies in the loop of Example 1 above. In this loop, transitions between true and false iterations of the conditional clause represent a loop-carried dependency that requires a break in parallelism. This can be handled using the following instructions:

| p1 = (t < FACTOR); | // p1 = {0 0 0 0 1 1 0 0} |
| p2 = ConditionalStop(p1, kTF\|kFT); | // p2 = {0 0 0 0 4 0 6 0} |

Because the 4th iteration generates the required data, and the 5th iteration depends on it, a 4 is stored in position 5 of the output vector p2 (which is the DIV). The same applies for the 7th iteration, which depends on data from the 6th iteration. Other elements of the DIV are set to 0 to indicate the absence of dependencies. (Note that in this example the first element of the vector is element number 1.)

dest=GeneratePredicates(Pred, DIV)

GeneratePredicates takes the dependency index vector, DIV, and generates predicates corresponding to the next group of elements that may safely be processed in parallel, given the previous group that was processed, indicated by pred. If no elements of Pred are active, predicates are generated for the first group of elements that may safely be processed in parallel. If Pred indicates that the final elements of the vector have been processed, then the instruction generates a result vector of inactive predicates indicating that no elements should be processed and the ZF flag is set. The CF flag is set to indicate that the last element of the results is active. Using the values in the first example, GeneratePredicates operates as follows:

| Entry Conditions: | // i2 = {0 0 0 0 4 0 6 0} |
| p2 = 0; | // p2 = {0 0 0 0 0 0 0 0} |
| Loop2: | |
| p2 = GeneratePredicates(p2,i2); | // p2' = {1 1 1 1 0 0 0 0} |
| CF = 0, ZF = 0 | |
| if(!PLAST( )) goto Loop2 | // p2" = {0 0 0 0 1 1 0 0} |
| CF = 0, ZF = 0 | // p2'"= {0 0 0 0 0 0 1 1} |
| CF = 1, ZF = 0 | |

From an initialized predicate p2 of all zeros, GeneratePredicates generates new instances of p2 that partition subsequent vector calculations into three sub-vectors (i.e., p', p", and p'''). This enables the hardware to process the vector in groups that avoid violating the data dependencies of the loop.

In FIG. 11A a diagram illustrating a sequence of variable states during scalar execution of the loop in Example 1 is shown. More particularly, using a randomized 50/50 distribution of the direction of the conditional expression, a progression of the variable states of the loop of Example 1 is shown. In FIG. 11B a diagram illustrating a progression of execution for Macroscalar vectorized program code of the loop of Example 1 is shown. In FIG. 11A and FIG. 11B, the values read from A[ ] are shown using leftward-slanting hash marks, while the values written to B[ ] are shown using rightward-slanting hash marks, and values for "r" or "s" (depending on which is changed in a given iteration) are shown using a shaded background. Observe that "r" never changes while "s" is changing, and vice-versa.

Nothing prevents all values from being read from A[ ] in parallel or written to B[ ] in parallel, because neither set of values participates in the loop-carried dependency chain. However, for the calculation of r and s, elements can be processed in parallel only while the value of the conditional expression remains the same (i.e., runs of true or false). This pattern for the execution of the program code for this loop is shown in of FIG. 11B. Note that the example uses vectors having eight elements in length. When processing the first vector instruction, the first iteration is performed alone (i.e., vector execution unit 204 processes only the first vector element), whereas iterations 1-5 are processed in parallel by vector execution unit 204, and then iterations 6-7 are processed in parallel by vector execution unit 204.

Referring to FIG. 12A and FIG. 12B, diagrams illustrating one embodiment of the vectorization of program code are shown. FIG. 12A depicts the original source code, while FIG. 12B illustrates the vectorized code representing the operations that may be performed using the Macroscalar architecture. In the vectorized code of FIG. 12B, Loop 1 is the loop from the source code, while Loop 2 is the vector-partitioning loop that processes the sub-vector partitions.

In the example, array A[ ] is read and compared in full-length vectors (i.e., for a vector of N elements, N positions of array A[ ] are read at once). Vector i2 is the DIV that controls partitioning of the vector. Partitioning is determined by monitoring the predicate p1 for transitions between false and true, which indicate loop-carried dependencies that should be observed. Predicate vector p2 determines which elements are to be acted upon at any time. In this particular loop, p1 has the same value in all elements of any sub-vector partition; therefore, only the first element of the partition needs to be checked to determine which variable to update.

After variable "s" is updated, the PropagatePostT instruction propagates the final value in the active partition to subsequent elements in the vector. At the top of the loop, the PropagatePriorF instruction copies the last value of "s" from the final vector position across all elements of the vector in preparation for the next pass. Note that variable "r" is propagated using a different method, illustrating the efficiencies of using the PropagatePriorF instruction in certain cases.

Software Speculation

In the previous example, the vector partitions prior to the beginning of the vector-partitioning loop could be determined because the control-flow decision was independent of the loop-carried dependencies. However, this is not always the case. Consider the following two loops shown in Example 2A and Example 2B:

Example 2A

Program Code Loop 1

```
j = 0;
for (x=0; x<KSIZE; ++x)
{
    if (A[x] < FACTOR)
    {
        j = A[x+j];
    }
    B[x] = j;
}
```

Example 2B

Program Code Loop 2

```
j = 0;
for (x=0; x<KSIZE; ++x)
{
    if (A[x+j] < FACTOR)
    {
        j = A[x];
    }
    B[x] = j;
}
```

In Example 2A, the control-flow decision is independent of the loop-carried dependency chain, while in Example 2B the control flow decision is part of the loop-carried dependency chain. In some embodiments, the loop in Example 2B may cause speculation that the value of "j" will remain unchanged and compensate later if this prediction proves incorrect. In such embodiments, the speculation on the value of "j" does not significantly change the vectorization of the loop.

In some embodiments, the compiler may be configured to always predict no data dependencies between the iterations of the loop. In such embodiments, in the case that runtime data dependencies exist, the group of active elements processed in parallel may be reduced to represent the group of elements that may safely be processed in parallel at that time. In these embodiments, there is little penalty for mispredicting more parallelism than actually exists because no parallelism is actually lost (i.e., if necessary, the iterations can be processed one element at a time, in a non-parallel way). In these embodiments, the actual amount of parallelism is simply recognized at a later stage.

dest=VectorReadIntFF(Base, Offset, pf)

VectorReadIntFF is a first-faulting variant of VectorReadInt. This instruction does not generate a fault if at least the first active element is a valid address. Results corresponding to invalid addresses are forced to zero, and flags pf are returned that can be used to mask predicates to later instructions that use this data. If the first active element of the address is unmapped, this instruction faults to allow a virtual memory system in computer system 100 (not shown) to populate a corresponding page, thereby ensuring that processor 102 can continue to make forward progress.

dest=Remaining(Pred)

The Remaining instruction evaluates a vector of predicates, Pred, and calculates the remaining elements in the vector. This corresponds to the set of inactive predicates following the last active predicate. If there are no active elements in Pred, a vector of all active predicates is returned. Likewise, if Pred is a vector of all active predicates, a vector of inactive predicates is returned. For example:

| |
|---|
| Entry: pred = {0 0 1 0 1 0 0 0} |
| Exit:  dest = {0 0 0 0 0 1 1 1} |

FIG. 13A and FIG. 13B are diagrams illustrating embodiments of example vectorized program code. More particularly, the code sample shown in FIG. 13A is a vectorized version of the code in Example 2A (as presented above). The code sample shown in FIG. 13B is a vectorized version of the code in Example 2B. Referring to FIG. 13B, the read of A[ ] and subsequent comparison have been moved inside the vector-partitioning loop. Thus, these operations presume (speculate) that the value of "j" does not change. Only after using "j" is it possible to determine where "j" may change value. After "j" is updated, the remaining vector elements are re-computed as necessary to iterate through the entire vector. The use of the Remaining instruction in the speculative code sample allows the program to determine which elements remain to be processed in the vector-partitioning loop before the program can determine the sub-group of these elements that are actually safe to process (i.e., that don't have unresolved data dependencies).

In various embodiments fault-tolerant read support is provided. Thus, in such embodiments, processor 102 may speculatively read data from memory using addresses from invalid elements of a vector instruction (e.g., VectorReadFF) in an attempt to load values that are to be later used in calculations. However, upon discovering that an invalid read has occurred, these values are ultimately discarded and, therefore, not germane to correct program behavior. Because such reads may reference non-existent or protected memory, these embodiments may be configured to continue normal execution in the presence of invalid but irrelevant data mistakenly read from memory. (Note that in embodiments that support virtual memory, this may have the additional benefit of not paging until the need to do so is certain.)

In the program loops shown in FIG. 13A and FIG. 13B, there exists a loop-carried dependency between iterations where the condition is true, and subsequent iterations, regardless of the predicate value for the later iterations. This is reflected in the parameters of the ConditionalStop instruction.

The sample program code in FIG. 13A and FIG. 13B highlights the differences between non-speculative and speculative vector partitioning. More particularly, in Example 2A memory is read and the predicate is calculated prior to the ConditionalStop. The partitioning loop begins after the ConditionalStop instruction. However, in Example 2B, the ConditionalStop instruction is executed inside the partitioning loop, and serves to recognize the dependencies that render earlier operations invalid. In both cases, the GeneratePredicates instruction calculates the predicates that control which elements are used for the remainder of the partitioning loop.

In the previous examples, the compiler was able to establish that no address aliasing existed at the time of compilation. However, such determinations are often difficult or impossible to make. The code segment shown in Example 3 below illustrates how loop-carried dependencies occurring through memory (which may include aliasing) are dealt with in various embodiments of the Macroscalar architecture.

Example 3

| Program Code Loop 3 |
|---|
| for (x=0; x<KSIZE; ++x) |
| { |
|   r = C[x]; |
|   s = D[x]; |
|   A[x] = A[r] + A[s]; |
| } |

In the code segment of EXAMPLE 3, the compiler cannot determine whether A[x] aliases with A[r] or A[s]. However, with the Macroscalar architecture, the compiler simply inserts instructions that cause the hardware to check for memory hazards at runtime and partitions the vector accordingly at runtime to ensure correct program behavior. One such instruction that checks for memory hazards is the CheckHazardP instruction which is described below.

dest=CheckHazardP(first, second, pred)

The CheckHazardP instruction examines two vectors of a memory address (or indices) corresponding to two memory operations for potential data dependencies through memory. The vector 'first' holds addresses for the first memory operation, and vector 'second' holds the addresses for the second operation. The predicate 'pred' indicates or controls which elements of 'second' are to be operated upon. As scalar loop iterations proceed forward in time, vector elements representing sequential iterations appear left to right within vectors. The CheckHazardP instruction may evaluate in this context. The instruction may calculate a DIV representing memory hazards between the corresponding pair of first and second memory operations. The instruction may correctly evaluates write-after-read, read-after-write, and write-after-write memory hazards.

As with the ConditionalStop instruction described above, the element position corresponding to the iteration that generates the data that is depended upon may be stored in the destination vector at the element position corresponding to the iteration that is dependent upon the data. If no data dependency exists, a zero may be stored in the destination vector at the element position corresponding to the iteration that does not have the dependency. For example:

| Entry: | first  | = {2 3 4 5 6 7 8 9} |
|---|---|---|
|        | second | = {8 7 6 5 4 3 2 1} |
|        | pred   | = {1 1 1 1 1 1 1 1} |
| Exit:  | dest   | = {0 0 0 0 3 2 1 0} |

As shown above, element 5 of the first vector ("first") and element 3 of the second vector ("second") both access array index 6. Therefore, a 3 stored in position 5 of DIV. Likewise, element 6 of first and element 2 of second both access array index position 7, causing a 2 to be stored in position 6 of DIV, and so forth. A zero is stored in the DIV where no data dependencies exist.

In some embodiments, the CheckHazardP instruction may account for various sizes of data types. However, for clarity we describe the function of the instruction using only array index types.

The memory access in the example above has three memory hazards. However, in the described embodiments, only two partitions may be needed to safely process the associated memory operations. More particularly, handling the first hazard on element position 3 renders subsequent dependencies on lower or equally numbered element positions moot. For example:

```
Entry Conditions:              //DIV  = {0 0 0 0 3 2 1 0}
                               // p2  = {0 0 0 0 0 0 0 0}
p2 = GeneratePredicates(p2,DIV);  // p2  = {1 1 1 1 0 0 0 0}
P2 = GeneratePredicates(p2,DIV)   // p2  = {0 0 0 0 1 1 1 1}
```

The process used by the described embodiments to analyze a DIV to determine where a vector should be broken is shown in pseudocode below. In some embodiments, the vector execution unit 204 of processor 102 may perform this calculation in parallel. For example:

```
List = <empty>;
for (x=STARTPOS; x<VECLEN; ++x)
{
    if(DIV[x] in List)
        Break from loop;
    else if(DIV[x]>0)
        Append <x> to List;
}
```

The vector may safely be processed in parallel over the interval [STARTPOS,x), where x is the position where DIV [x]>0. That is, from STARTPOS up to (but not including) position x, where STARTPOS refers to the first vector element after the set of elements previously processed. If the set of previously processed elements is empty, then STARTPOS begins at the first element.

In some embodiments, multiple DIVs may be generated in code using ConditionalStop and/or CheckHazardP instructions. The GeneratePredicates instruction, however, uses a single DIV to partition the vector. There are two methods for dealing with this situation: (1) partitioning loops can be nested; or (2) the DIVs can be combined and used in a single partitioning loop. Either approach yields correct results, but the optimal approach depends on the characteristics of the loop in question. More specifically, where multiple DIVS are expected not to have dependencies, such as when the compiler simply cannot determine aliasing on input parameters, these embodiments can combine multiple DIVs into one, thus reducing the partitioning overhead. On the other hand, in cases with an expectation of many realized memory hazards, these embodiments can nest partitioning loops, thereby extracting the maximum parallelism possible (assuming the prospect of additional parallelism exists).

In some embodiments, DIVs may be combined using a VectorMax(A,B) instruction as shown below.

```
i2 = CheckHazardP(a,c,p0);     //i2 = {0 0 2 0 2 4 0 0}
i3 = CheckHazardP(b,c,p0);     //i3 = {0 0 1 3 3 0 0 0}
ix = VectorMax(i2,i3);         //ix = {0 0 2 3 3 4 0 0}
```

Because the elements of a DIV should only contain numbers less than the position of that element, which represent dependencies earlier in time, later dependencies only serve to further constrain the partitioning, which renders lower values redundant from the perspective of the GeneratePredicates instruction. Thus, taking the maximum of all DIVs effectively causes the GeneratePredicates instruction to return the intersection of the sets of elements that can safely be processed in parallel.

FIG. 14 is a diagram illustrating one embodiment of example vectorized program code. More particularly, the code sample shown in FIG. 14 is a vectorized version of the code in Example 3 (as presented above). Referring to FIG. 14, no aliasing exists between C[ ] or D[ ] and A[ ], but operations on A[ ] may alias one another. If the compiler is unable to rule out aliasing with C[ ] or D[ ], the compiler can generate additional hazard checks. Because there is no danger of aliasing in this case, the read operations on arrays C[ ] and D[ ] have been positioned outside the vector-partitioning loop, while operations on A[ ] remain within the partitioning loop. If no aliasing actually exists with A[ ], the partitions retain full vector size, and the partitioning loop simply falls through without iterating. However, for iterations where aliasing does occur, the partitioning loop partitions the vector to respect the data dependencies thereby ensuring correct operation.

In the embodiment shown in the code segment of FIG. 14, the hazard check is performed across the entire vector of addresses. In the general case, however, it is often necessary to check hazards between conditionally executed memory operations. The CheckHazardP instruction takes a predicate that indicates which elements of the second memory operation are active. If not all elements of the first operation are active, the CheckHazardP instruction itself can be predicated with a zeroing predicate corresponding to those elements of the first operand which are active. (Note that this may yield correct results for the cases where the first memory operation is predicated.)

The code segment in Example 4 below illustrates a loop with a memory hazard on array E[ ]. The code segment conditionally reads and writes to unpredictable locations within the array. In FIG. 15 a diagram illustrating one embodiment of example vectorized program code is shown. More particularly, the code sample shown in FIG. 15 is a vectorized Macroscalar version of the code in Example 4 (as presented above).

Example 4

```
Program Code Loop 4 j = 0;
for (x=0; x<KSIZE; ++x)
{
    f = A[x];
    g = B[x];
    if (f < FACTOR)
    {
        h = C[x];
        j = E[h];
    }
    if (g < FACTOR)
    {
        i = D[x];
        E[i] = j;
    }
}
```

Referring to FIG. 15, the vectorized loop includes predicates p1 and p2 which indicate whether array E[ ] is to be read or written, respectively. The CheckHazardP instruction checks vectors of addresses (h and i) for memory hazards. The parameter p2 is passed to CheckHazardP as the predicate controlling the second memory operation (the write). Thus, CheckHazardP identifies the memory hazard(s) between unconditional reads and conditional writes predicated on p2. The result of CheckHazardP is zero-predicated in p1. This places zeroes in the DIV(ix) for element positions that are not to be read from E[ ]. Recall that a zero indicates no hazard. Thus, the result, stored in ix, is a DIV that represents the hazards between conditional reads predicated on p1 and conditional writes predicated on p2. This is made possible because non-hazard conditions are represented with a zero in the DIV.

It is noted that in the above embodiments, to check for memory-based hazards, the CheckHazardP instruction was used. As described above, the CheckHazardP instruction takes a predicate as a parameter that controls which elements of the second vector are operated upon. However, in other embodiments other types of CheckHazard instructions may be used. In one embodiment, this version of the CheckHazard instruction may simply operate unconditionally on the two input vectors. Regardless of which version of the CheckHazard instruction is employed, it is noted that as with any Macroscalar instruction that supports result predication and/or zeroing, whether or not the a given element of a result vector is modified by execution of the CheckHazard instruction may be separately controlled through the use of a predicate vector or zeroing vector, as described above. That is, the predicate parameter of the CheckHazardP instruction controls a different aspect of instruction execution than the general predicate/zeroing vector described above.

Numerous variations and modifications will become apparent to those skilled in the art once the above disclosure is fully appreciated. It is intended that the following claims be interpreted to embrace all such variations and modifications.

What is claimed is:

1. A processor comprising:
a register attribute tracker configured to receive instruction operations corresponding to an instruction stream, and in response to receiving a first instruction operation specifying a plurality of input registers, wherein the plurality of input registers are each configured to store a vector to be operated upon during execution of the first instruction operation, and further in response to the register attribute tracker having associated a tracked attribute with a first input register of the plurality of input registers, the register attribute tracker is configured to associate a second attribute to a second input register specified by the first instruction operation based on the tracked attribute of the first input register, wherein the tracked attribute and the second attribute specify vector size information, and wherein the register attribute tracker is configured to operate on the first instruction operation prior to issuance of the first instruction operation for execution in the processor, and wherein the register attribute tracker is configured to track different attributes with respect to different registers at a given point in time.

2. The processor as recited in claim 1 wherein the register attribute tracker is further configured to associate a third attribute with an output register specified by the first instruction operation, based on the tracked attribute.

3. The processor as recited in claim 2 wherein the third attribute is a function of the tracked attribute and a defined operation of the first instruction operation.

4. The processor as recited in claim 2 wherein the third attribute is equal to the tracked attribute.

5. The processor as recited in claim 1 wherein the first input register is a vector register.

6. The processor as recited in claim 5 wherein the second input register is a predicate vector register.

7. The processor as recited in claim 1 wherein the first input register is a predicate vector register.

8. The processor as recited in claim 7 wherein the second input register is a vector register.

9. A processor comprising:
an issue circuit configured to issue a first instruction operation for execution, wherein a first attribute of the first instruction corresponding to the first instruction operation is architecturally defined by data from a first input register specified by the first instruction, and wherein the issue circuit is configured to issue the first instruction operation prior to receiving the first attribute responsive to inferring the first attribute from a second attribute associated with a second input register specified by the first instruction operation, wherein the first attribute and the second attribute specify vector size information, and wherein the first input register is configured to store a vector of operands to be operated upon during execution of the first instruction operation.

10. The processor as recited in claim 9 wherein the first input register is a predicate register, wherein the data further includes at least one predicate for the first instruction operation.

11. The processor as recited in claim 10 wherein the first instruction operation is a vector instruction operation and the at least one predicate is a plurality of predicates, each of the plurality of predicates corresponding to a vector element of a vector on which the processor is configured to operate in response to executing the vector instruction operation.

12. The processor as recited in claim 9 wherein the first attribute controls an aspect of execution of the first instruction operation.

13. The processor as recited in claim 12 wherein the aspect is a vector element size for elements of a vector operated upon by the processor in response to executing the first instruction operation.

14. The processor as recited in claim 12 wherein the aspect is a number of vector elements of a vector operated upon by the processor in response to executing the first instruction operation.

15. The processor as recited in claim 12 wherein the aspect is a vector size of a vector operated upon by the processor in response to executing the first instruction operation.

16. The processor as recited in claim 12 wherein the aspect is a partition size, wherein a vector operated upon by the processor in response to executing the first instruction operation includes a plurality of partitions.

17. A processor comprising:
an issue circuit configured to infer an attribute of a first instruction operation from a first input register specified by the first instruction operation, wherein the attribute is architecturally defined to be controlled by data from a second input register specified by the first instruction operation, and wherein the issue circuit is configured to transmit an indication of the inferred attribute to a register attribute tracker, wherein the attribute specifies vector size information, and wherein the first input register is configured to store a vector of operands to be operated upon during execution of the first instruction operation; and
the register attribute tracker coupled to receive the indication of the inferred attribute, wherein the register attribute tracker is configured to associate the inferred attribute with the second input register, wherein the register attribute tracker is configured to track different attributes with respect to different registers at a given point in time.

18. The processor as recited in claim 17 wherein the register attribute tracker is further configured to associate a third attribute with an output register specified by the first instruction operation, based on the inferred attribute.

19. The processor as recited in claim 18 wherein the third attribute is a function of the inferred attribute and a defined operation of the first instruction operation.

20. The processor as recited in claim 18 wherein the third attribute is equal to the inferred attribute.

* * * * *